United States Patent
Nakamura

(10) Patent No.: US 8,036,806 B2
(45) Date of Patent: Oct. 11, 2011

(54) VARIABLE VALVE ACTUATION SYSTEM OF INTERNAL COMBUSTION ENGINE AND CONTROL APPARATUS OF INTERNAL COMBUSTION ENGINE

(75) Inventor: Makoto Nakamura, Isehara (JP)

(73) Assignee: Hitachi, Ltd., Tokyo (JP)

( * ) Notice: Subject to any disclaimer, the term of this patent is extended or adjusted under 35 U.S.C. 154(b) by 388 days.

(21) Appl. No.: 12/372,307

(22) Filed: Feb. 17, 2009

(65) Prior Publication Data

US 2009/0228187 A1 Sep. 10, 2009

(30) Foreign Application Priority Data

Mar. 6, 2008 (JP) ................... 2008-056234

(51) Int. Cl.
*F01L 1/34* (2006.01)
*F01L 1/44* (2006.01)

(52) U.S. Cl. ................... 701/102; 123/559.1; 123/90.16

(58) Field of Classification Search ................... 701/110, 701/101, 102; 123/90.15, 90.16, 90.17, 90.2, 123/90.39, 90.44, 345, 346, 347, 348, 90.11, 123/90.12, 559.1, 316, 559.3, 564, 565

See application file for complete search history.

(56) References Cited

U.S. PATENT DOCUMENTS

| | | | |
|---|---|---|---|
| 5,427,078 A * | 6/1995 | Hitomi et al. ............... | 123/559.1 |
| 6,041,746 A | 3/2000 | Takemura et al. | |
| 6,832,585 B2 | 12/2004 | Watanabe | |
| 7,252,058 B2 | 8/2007 | Tashiro | |
| 7,415,966 B2 | 8/2008 | Irisawa | |
| 2003/0075151 A1* | 4/2003 | Machida et al. ............... | 123/399 |
| 2005/0188931 A1* | 9/2005 | Akasaka et al. ............ | 123/90.16 |
| 2006/0037568 A1* | 2/2006 | Arinaga et al. ............ | 123/90.15 |

FOREIGN PATENT DOCUMENTS

| | | |
|---|---|---|
| JP | 2-119641 A | 5/1990 |
| JP | 11-141375 A | 5/1999 |
| JP | 11-257109 A | 9/1999 |
| JP | 11-264307 A | 9/1999 |
| JP | 2003-172112 A | 6/2003 |
| JP | 2003-314315 A | 11/2003 |
| JP | 2004-92619 A | 3/2004 |
| JP | 2004-156508 A | 6/2004 |
| JP | 2006-283754 | 10/2006 |
| JP | 2006-307765 A | 11/2006 |
| JP | 2007-9768 A | 1/2007 |
| WO | WO 02/061241 A1 | 8/2002 |

* cited by examiner

*Primary Examiner* — Mahmoud Gimie
(74) *Attorney, Agent, or Firm* — Foley & Lardner LLP

(57) ABSTRACT

In a control apparatus of a supercharged internal combustion engine, a variable valve actuation system interacts with an engine control system. A controller is configured or programmed to increase an intake-valve lift by a variable valve lift mechanism, which is provided for variably controlling at least the intake-valve lift of engine valves, when starting from a vehicle stand-still state or when accelerating from an idling state or a light load state. The controller is further configured or programmed to increase a valve overlap of intake and exhaust valves by a variable phase control mechanism, which is provided for variably phase-shifting a central phase angle of a valve lift characteristic curve of at least one of the intake and exhaust valves, while increasing a boost pressure of intake air introduced into an engine cylinder by a supercharging device, after the intake-valve lift has been increased.

20 Claims, 21 Drawing Sheets

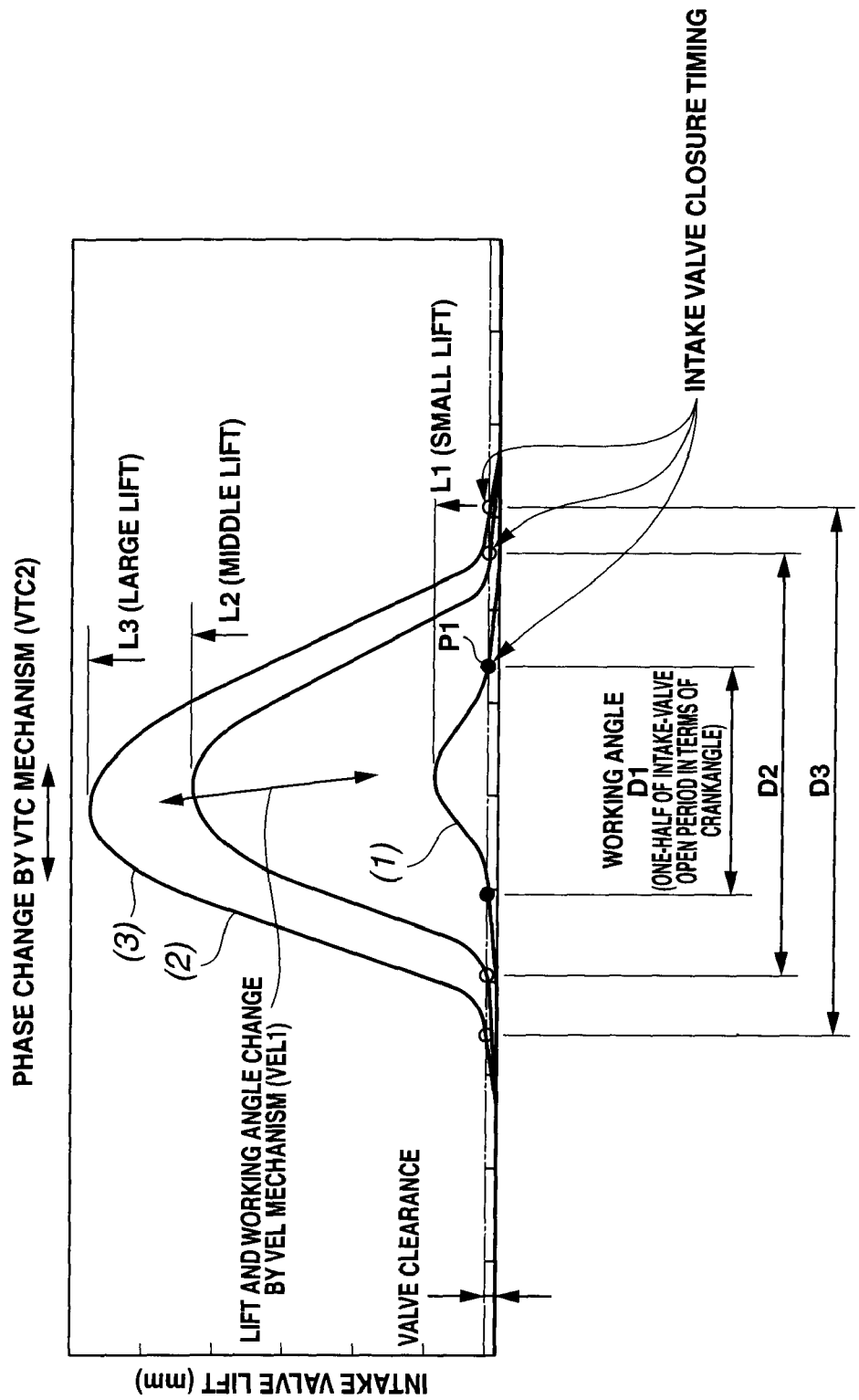

VARIABLE VALVE ACTUATION SYSTEM OF INTERNAL COMBUSTION ENGINE AND CONTROL APPARATUS OF INTERNAL COMBUSTION ENGINE

TECHNICAL FIELD

The present invention relates to a variable valve actuation system of an internal combustion engine employing a variable valve event and lift (VEL) mechanism, a variable phase control mechanism (a valve timing control (VTC) mechanism) and a supercharging device, and specifically to a control apparatus configured to enhance an acceleration responsiveness of the supercharged engine by controlling the VEL and VTC mechanisms, when accelerating an automotive vehicle.

BACKGROUND ART

In recent years, there have been proposed and developed various supercharged internal combustion engines capable of increasing an engine torque by supercharging intake air by means of a supercharging device installed in the intake system. One such supercharged engine has been disclosed in Japanese Patent Provisional Publication No. 2-119641 (hereinafter is referred to as "JP02-119641").

The supercharged engine of JP02-119641 also employs a variable phase control mechanism (a VTC mechanism) configured to variably control a phase of valve open timing and valve closure timing of an engine valve (either one of intake and exhaust valves), and a controller configured to control the operation of the VTC mechanism depending on engine operating conditions, such as engine load and/or engine speed. For instance, during high load operation, a valve overlap of intake and exhaust valves is controlled to become greater (longer). Conversely during low load operation, the valve overlap is controlled to become smaller (shorter).

Furthermore, when an engine load rise has occurred from a non-load state (e.g., an idling state where the engine runs without load with an accelerator pedal released) or a light engine load state, the controller, incorporated in the supercharged engine of JP02-119641, is configured to execute valve-overlap enlargement control in such a manner as to increase residual gas in the engine cylinder, thus reducing exhaust emissions, such as oxides of nitrogen (NOx).

SUMMARY OF THE INVENTION

However, when quickly accelerating the vehicle from a non-load state (e.g., an idling state) or a light load state, in other words, when a rapid engine load rise occurs, it is difficult to provide a sufficient vehicle-acceleration response in the case of an internal combustion engine as disclosed in JP02-119641, employing a mechanical supercharging device, for the reasons discussed below.

In the supercharged internal combustion engine using a supercharger (e.g., a typical Roots blower supercharger) as a mechanical supercharging device, which is installed in the intake system, generally, a shift of an electromagnetic clutch of the supercharger to a clutch-engagement state takes place after the accelerator opening has been increased with an accelerator-pedal depression from a light engine-load state. That is, such a mechanically supercharged engine is generally designed or configured, so that the supercharger comes into operation with the electromagnetic clutch energized (engaged) due to the increased accelerator opening. Owing to a mechanical response delay of engagement of the electromagnetic clutch, it is difficult to ensure the sufficiently enhanced acceleration response.

Accordingly, in the internal combustion engine with a mechanical supercharging device, it is desirable to enhance a transient acceleration responsiveness as well as a transient engine-torque-increase responsiveness, when accelerating the vehicle from a non-load state (e.g., an idling state) or a light load state.

It is, therefore, in view of the previously-described disadvantages of the prior art, an object of the invention to provide a variable valve actuation system of an internal combustion engine and an engine control apparatus, configured to be able to enhance the transient acceleration responsiveness as well as the transient engine-torque-increase responsiveness, when accelerating the vehicle from a non-load state (e.g., an idling state) or a light load state.

In order to accomplish the aforementioned and other objects of the present invention, a variable valve actuation system of an internal combustion engine employing a supercharging device for supercharging intake air into an engine cylinder, comprises a variable valve lift mechanism provided for variably controlling at least an intake-valve lift of engine valves, a variable phase control mechanism provided for variably phase-shifting a central phase angle of a valve lift characteristic curve of at least one of intake and exhaust valves, and a control system configured to electronically connected to the variable valve lift mechanism, the variable phase control mechanism, and the supercharging device, the control system programmed to perform the following, (a) increasing the intake-valve lift by the variable valve lift mechanism when an accelerator opening increases from a small accelerator-opening condition, and increasing a valve overlap of the intake and exhaust valves by the variable phase control mechanism, while increasing a boost pressure by the supercharging device, after the intake-valve lift has been increased.

According to another aspect of the invention, a control apparatus of an internal combustion engine, comprises a controller programmed to perform the following, (a) increasing an intake-valve lift by a variable valve lift mechanism, which is provided for variably controlling at least the intake-valve lift of engine valves, when starting from a vehicle stand-still state, and (b) increasing a valve overlapping time period, during which intake and exhaust valves are both open, by a variable phase control mechanism, which is provided for variably phase-shifting a central phase angle of a valve lift characteristic curve of at least one of the intake and exhaust valves, while increasing a boost pressure of intake air introduced into an engine cylinder by a supercharging device, after the intake-valve lift has been increased.

According to a further aspect of the invention, a control apparatus of an internal combustion engine, comprises a controller programmed to perform the following, (a) increasing an intake-valve lift by a variable valve lift mechanism, which is provided for variably controlling at least the intake-valve lift of engine valves, when an engine speed rises from an engine idling speed, and (b) increasing a valve overlap between intake valve open timing of an intake valve and exhaust valve closure timing of an exhaust valve by a variable phase control mechanism, which is provided for variably phase-shifting a central phase angle of a valve lift characteristic curve of at least one of the intake and exhaust valves, while increasing a boost pressure of intake air introduced into an engine cylinder by a supercharging device, when the intake-valve lift reaches and exceeds a predetermined lift amount.

The other objects and features of this invention will become understood from the following description with reference to the accompanying drawings.

BRIEF DESCRIPTION OF THE DRAWINGS

FIG. 5 is a valve lift characteristic diagram illustrating the relationship among an intake-valve lift, a working angle, intake valve open timing and intake valve closure timing in the variable valve actuation system of the first embodiment.

DESCRIPTION OF THE PREFERRED EMBODIMENTS

First Embodiment

Figure 1:
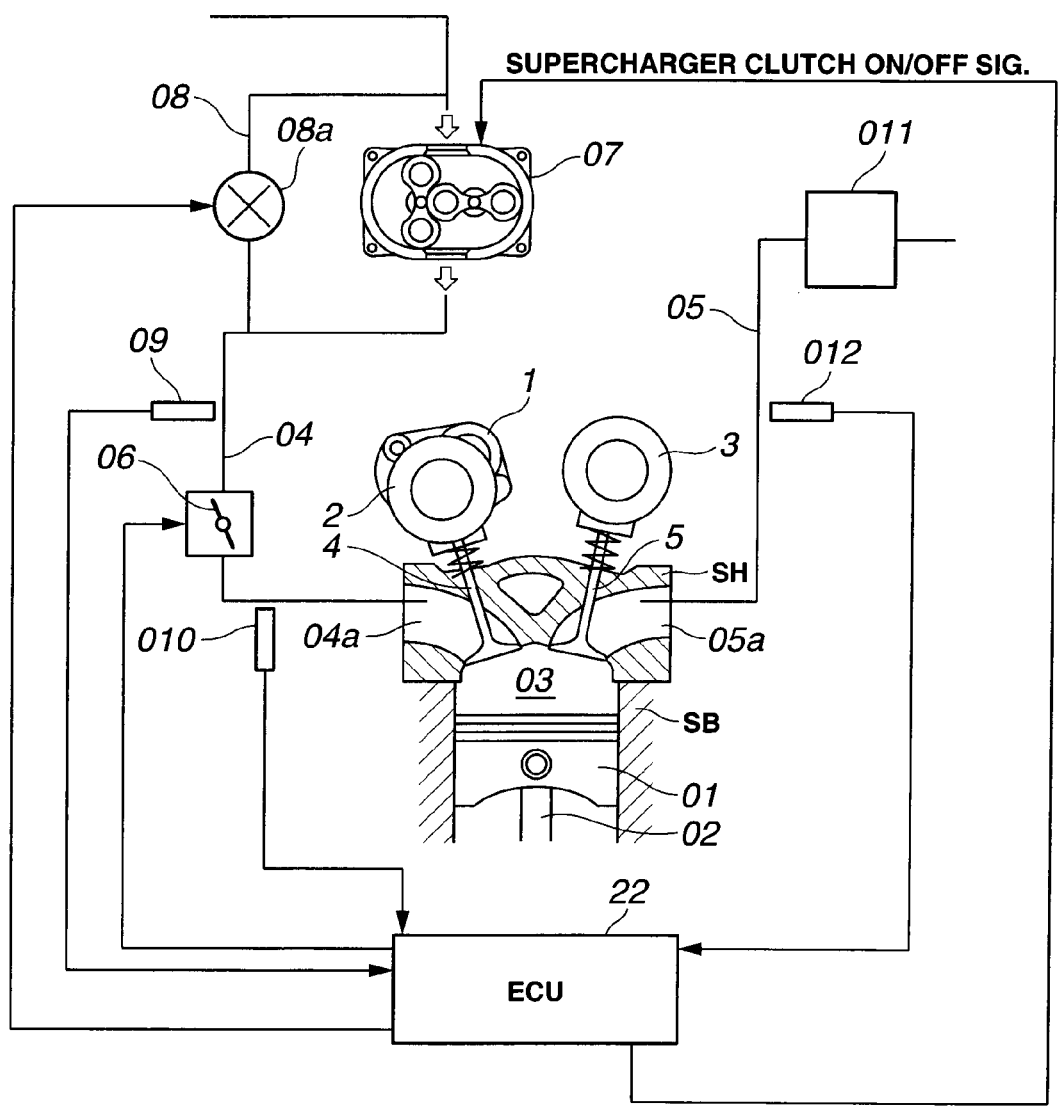
FIG. 1 is a schematic diagram illustrating a supercharged internal combustion engine to which a variable valve actuation system and an engine control apparatus of the first embodiment is applied.

Referring now to the drawings, particularly to FIG. 1, the variable valve actuation system and the engine control apparatus of the first embodiment is exemplified in a supercharged, four-cycle internal combustion engine.

As can be appreciated from the system diagram of FIG. 1, the internal combustion engine has four valves for each cylinder, namely, two intake valves 4, 4 and two exhaust valves 5, 5 per one cylinder. An intake-valve variable valve event and lift (VEL) mechanism 1 (or an intake-valve variable lift mechanism VEL1) and an intake-valve variable phase control mechanism or an intake-valve valve timing control (VTC) mechanism 2 (or an intake-valve variable phase-angle mechanism VTC2) are installed on one axial end of an intake-valve drive shaft 6 (described later), which is rotatably supported on an engine cylinder head SH. The intake-valve VEL mechanism 1 is provided for variably controlling or adjusting a valve lift amount and a working angle of each of intake valves 4, 4. The intake-valve VTC mechanism 2 is provided for variably controlling or adjusting a phase of intake valve open timing (often abbreviated to "IVO") and intake valve closure timing (often abbreviated to "IVC") of each of intake valves 4, 4, in other words, a phase of working angle of intake valve 4, corresponding to a phase angle at the maximum intake valve lift point (often called "central phase angle") of the valve lift characteristic curve. On the other hand, an exhaust-valve variable phase control mechanism or an exhaust-valve valve timing control (VTC) mechanism 3 (or an exhaust-valve variable phase-angle mechanism VTC3) is installed on one axial end of an exhaust-valve camshaft (not numbered). The exhaust-valve VTC mechanism 3 is provided for variably controlling or adjusting a phase of exhaust valve open timing (often abbreviated to "EVO") and exhaust valve closure timing (often abbreviated to "EVC") of each of exhaust valves 5, 5, in other words, a phase of working angle of exhaust valve 5, corresponding to a phase angle at the maximum exhaust valve lift point.

A cylinder block SB has a cylinder bore in which a reciprocating piston 01 moves up and down. Cylinder head SH is formed with a pair of intake-valve ports 04a, 04a and a pair of exhaust-valve ports 05a, 05a. The intake-valve pair 4, 4 and the exhaust-valve pair 5, 5 are slidably mounted on cylinder head SH, for opening and closing the respective opening ends of intake-valve ports 04a, 04a and exhaust-valve ports 05a, 05a.

Piston 01 is linked to an engine crankshaft (not shown) via a connecting rod 02. A combustion chamber 03 is defined between the piston crown of reciprocating piston 01 and the bottom face of cylinder head SH.

For subsidiarily controlling a quantity of intake air for safety purposes and for creating a vacuum existing in the induction system for the purpose of recirculation of blow-by fumes in a blowby-gas recirculation system and/or canister purging in an evaporative emission control system, usually installed on practicable internal combustion engines, a throttle valve 06 (exactly, an electronically-controlled throttle valve) is arranged upstream of intake-valve ports 04a, 04a and located in an intake passage (or an intake pipe) 04, through which air is drawn via intake-valve ports 4a, 4a into combustion chamber 03. A fuel injector or a fuel injecting valve (not shown) is provided downstream of throttle valve 06 and installed in cylinder head SH, for directly injecting fuel spray into combustion chamber 03.

A mechanical supercharger 07, such as a generally-known electromagnetic-clutch equipped Roots blower supercharger, is provided in intake passage 04 upstream of throttle valve 06. In order to increase the weight of air charge and consequently engine power output from a given engine size, supercharger 07 is provided for introducing intake air (fresh air) into the engine cylinders at a pressure (often called "boost pressure") in excess of that which can be obtained by natural aspiration. Supercharger 07 is kept in its operative state with the electromagnetic clutch energized. Conversely with the electromagnetic clutch de-energized, supercharger 07 is kept in its inoperative state. The mechanical supercharger can be driven or operated at an arbitrary operational timing responsively to a control command signal from ECU 22. More concretely, in a non-load state (e.g., at idle) where the engine runs without load or in a light engine load state, supercharger 07 is kept in the inoperative state, in order to avoid the engine from unstably idling or rotating at idle or at light load operation. In order to avoid the resistance to intake-air flow from increasing owing to a pair of hourglass-shaped members, which are disposed in the supercharger casing and whose rotary motions are almost stopped in the supercharger inoperative state, a bypass valve (exactly, an electronically-controlled intake bypass valve) 08a is provided in a bypass passage 08 of intake passage 04. To permit air to be smoothly supplied into combustion chamber 03 at idle or at light load operation, bypass valve 08a is kept open in the supercharger inoperative state.

A boost pressure sensor 09 is located between throttle valve 06 and supercharger 07 for detecting or measuring a boost pressure Pb of supercharger 07. An intake-pipe pressure sensor (or an intake manifold pressure sensor) 010 is located downstream of throttle valve 06 for detecting or measuring an internal pressure in intake passage (the intake pipe) 04.

A three way catalytic converter 011 is arranged downstream of an exhaust manifold of an exhaust passage 05. An air/fuel ratio sensor (simply, an A/F sensor) 012 is arranged upstream of three way catalytic converter 011 for detecting an air/fuel mixture ratio or monitoring the percentage of oxygen contained within engine exhaust gases.

Sensor signals from boost pressure sensor 09, intake-pipe pressure sensor 010, and A/F sensor 012 are input into an electronic control unit (ECU) 22 (described later).

The intake-valve VEL mechanism 1 is able to simultaneously adjust both of a valve lift and a working angle of each of intake valves 4, 4. As the intake-valve VEL mechanism 1, the variable valve actuation system of the first embodiment uses a continuously variable valve event and lift control mechanism as disclosed in Japanese Patent Provisional Publication No. 2003-172112. The configuration of VEL mechanism 1 is hereunder described in reference to FIGS. 2-4.

Figure 2:
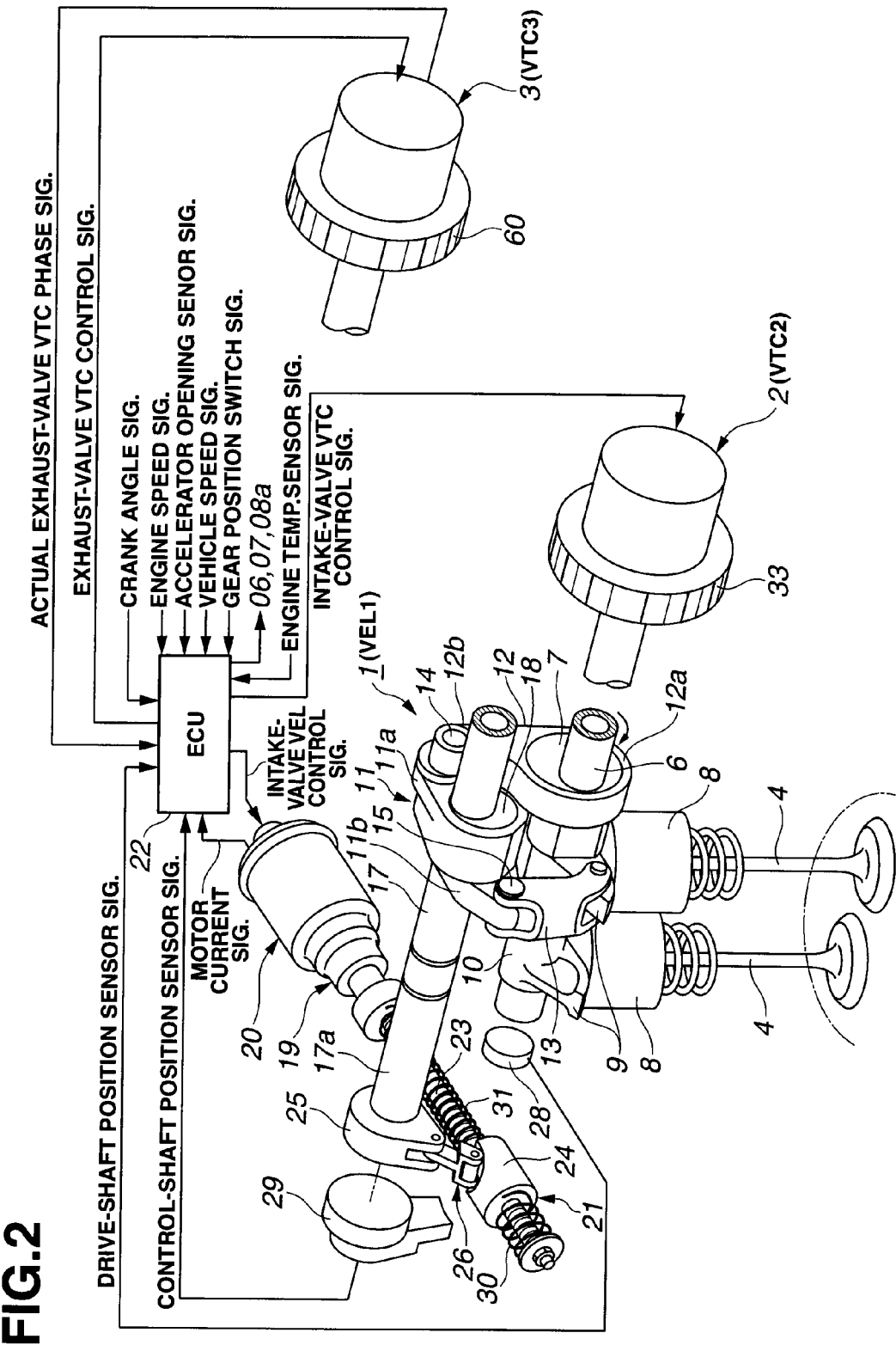
FIG. 2 is a perspective view illustrating the essential part of the variable valve actuation system of the first embodiment.

Briefly speaking, as shown in FIG. 2, VEL mechanism 1 is comprised of a cylindrical hollow drive shaft 6, a ring-shaped drive cam 7, two rockable cams 9, 9, and a multinodular-link motion transmitting mechanism (simply, a motion converter) mechanically linked between drive cam 7 and the rockable-cam pair 9, 9 for transmitting a torque created by drive cam (eccentric cam) 7 as an oscillating force of each of rockable cams 9, 9. Cylindrical hollow drive shaft 6 is rotatably supported by bearings in the upper part of cylinder head SH. Drive cam 7 is formed as an eccentric cam that is press-fitted or integrally connected onto the outer periphery of drive shaft 6. Rockable cams 9, 9 are oscillatingly or rockably supported on the outer periphery of drive shaft 6 and in sliding-contact with respective upper contact surfaces of two valve lifters 8, 8, which are located at the valve stem ends of intake valves 4, 4. In other words, the motion converter is provided to convert a rotary motion (input torque) of drive cam 7 into an up-and-down motion (a valve opening force) of each intake valve 4 (i.e., an oscillating force creating an oscillating motion of each rockable cam 9).

Torque is transmitted from the engine crankshaft through a timing sprocket 33 fixedly connected to the axial end of drive shaft 6 via a timing chain (not shown) to drive shaft 6. As indicated by the arrow in FIG. 2, the direction of rotation of drive shaft 6 is set in a clockwise direction.

Drive cam 7 has an axial bore that is displaced from the geometric center of the cylindrical drive cam 7. Drive cam 7 is fixedly connected to the outer periphery of drive shaft 6, so that the inner peripheral surface of the axial bore of drive cam 7 is press-fitted onto the outer periphery of drive shaft 6. Thus, the center of drive cam 7 is offset from the shaft center of drive shaft 6 in the radial direction by a predetermined eccentricity (or a predetermined offset value).

As best seen from the axial rear views shown in FIGS. 3A-3B and 4A-4B, each of rockable cams 9, 9 is formed as a substantially raindrop-shaped cam. Rockable cams 9, 9 have the same cam profile. Rockable cams 9, 9 are formed integral with respective axial ends of a cylindrical-hollow camshaft 10. Cylindrical-hollow camshaft 10 is rotatably supported on drive shaft 6. The outer peripheral contacting surface of rockable cam 9, in sliding-contact with the upper contact surface of valve lifter 8, includes a cam surface 9a. The base-circle portion of rockable cam 9 is integrally formed with or integrally connected to camshaft 10, to permit oscillating motion of rockable cam 9 on the axis of drive shaft 6. The outer peripheral surface (cam surface 9a) of rockable cam 9 is constructed by a base-circle surface, a circular-arc shaped ramp surface extending from the base-circle surface to a cam-nose portion, a top-circle surface (simply, a top surface) that provides a maximum valve lift (or a maximum lift amount), and a lift surface by which the ramp surface and the top surface are joined. The base-circle surface, the ramp surface, the lift surface, and the top surface abut predetermined positions of the upper surface of valve lifter 8, depending on the oscillatory position of rockable cam 9.

The motion converter is comprised of a rocker arm 11 laid out above drive shaft 6, a link arm 12 mechanically linking one end (or a first arm portion 11a) of rocker arm 11 to the drive cam 7, and a link rod 13 mechanically linking the other end (a second arm portion 11b) of rocker arm 11 to the cam-nose portion of rockable cam 9.

Rocker arm 11 is formed with an axially-extending center bore (a through opening). The rocker-arm center bore of rocker arm 11 is rotatably fitted onto the outer periphery of a control cam 18 (described later), to cause a pivotal motion (or an oscillating motion) of rocker arm 11 on the axis of control cam 18. The first arm portion 11a of rocker arm 11 extends from the axial center bore portion in a first radial direction, whereas the second arm portion 11b of rocker arm 11 extends from the axial center bore portion in a second radial direction substantially opposite to the first radial direction. The first arm portion 11a of rocker arm 11 is rotatably pin-connected to link arm 12 by means of a connecting pin 14, while the second arm portion 11b of rocker arm 11 is rotatably pin-connected to one end (a first end 13a) of link rod 13 by means of a connecting pin 15.

Link arm 12 is comprised of a comparatively large-diameter annular base portion 12a and a comparatively small-diameter protruding end portion 12b radially outwardly extending from a predetermined portion of the outer periphery of large-diameter annular base portion 12a. Large-diameter annular base portion 12a is formed with a drive-cam retaining bore, which is rotatably fitted onto the outer periphery of drive cam 7. On the other hand, small-diameter protruding end portion 12b of link arm 12 is pin-connected to the first arm portion 11a of rocker arm 11 by means of connecting pin 14.

Link rod 13 is pin-connected at the other end (a second end 13b) to the cam-nose portion of rockable cam 9 by means of a connecting pin 16.

Also provided is a motion-converter attitude control mechanism that changes an initial actuated position (a fulcrum of oscillating motion of rocker arm 11) of the motion converter. As clearly shown in FIGS. 3A-3B and 4A-4B, the attitude control mechanism includes a control shaft 17 and control cam 18. Control shaft 17 is located above and arranged in parallel with drive shaft 6 in such a manner as to extend in the longitudinal direction of the engine, and rotatably supported on cylinder head SH by means of the same bearing members as drive shaft 6. Control cam 18 is attached to the outer periphery of control shaft 17 and slidably fitted into and oscillatingly supported in a control-cam retaining bore formed in rocker arm 11. Control cam 18 serves as a fulcrum of oscillating motion of rocker arm 11. Control cam 18 is integrally formed with control shaft 17, so that control cam 18 is fixed onto the outer periphery of control shaft 17. Control cam 18 is formed as an eccentric cam having a cylindrical cam profile. The axis (the geometric center) of control cam 18 is displaced a predetermined distance from the axis of control shaft 17.

As shown in FIG. 2, the attitude control mechanism also includes a drive mechanism 19 that produces a rotary motion of control shaft 17. Drive mechanism 19 is comprised of a geared motor or an electric control-shaft actuator 20 fixed to one end of a housing (not shown) and a ball-screw motion-transmitting mechanism (simply, a ball-screw mechanism) 21 that transmits a motor torque created by motor 20 to control shaft 17. In more detail, motor 20 is constructed by a proportional control type direct-current (DC) motor. Motor 20 is controlled in response to a control signal, which is generated from the output interface circuitry of ECU 22 and whose signal value is determined based on engine/vehicle operating conditions.

Ball-screw mechanism 21 is comprised of a ball-screw shaft (or a worm shaft) 23 coaxially aligned with and connected to the motor output shaft of motor 20, a substantially cylindrical, movable ball nut 24 threadably engaged with the outer periphery of ball-screw shaft 23, a link arm 25 fixedly connected to the rear end 17a of control shaft 17, a link member 26 mechanically linking link arm 25 to ball nut 24, and recirculating balls interposed between the worm teeth of ball-screw shaft 23 and guide grooves cut in the inner peripheral wall surface of ball nut 24. In a conventional manner, a rotary motion (input torque) of ball-screw shaft 23 is converted into a rectilinear motion of ball nut 24 through the recirculating balls. Ball nut 24 is axially forced toward motor 20 (i.e., toward the minimum valve-lift side) by the spring force of a return spring (a first coil spring) 30, serving as a first biasing device or first biasing means. Additionally, ball nut 24 is axially forced apart from motor 20 (i.e., toward the maximum valve-lift side) by the spring force of a return spring (a second coil spring) 31, serving as a second biasing device or second biasing means, which is arranged to be opposed to the first coil spring 30. By virtue of the two opposing spring forces of first and second coil springs 30-31, in the engine stopped state, ball nut 24 is stably held at the axial intermediate position of ball-screw shaft 23 (i.e., in a middle valve-lift range between the minimum and maximum valve lifts). In other words, ball-screw mechanism 21 is configured, so that ball nut 24 is mechanically returned to and stably held at its neutral position corresponding to the intermediate position of ball-screw shaft 23, in the engine stopped state.

As shown in FIGS. 1-2, ECU 22 generally comprises a microcomputer. ECU 22 includes an input/output interface circuitry (I/O), memories (RAM, ROM), and a microprocessor or a central processing unit (CPU). The input/output interface circuitry (I/O) of ECU 22 receives input information from various engine/vehicle switches and sensors, namely a crank angle sensor 27, an accelerator opening sensor, which is provided for detecting an accelerator opening θ, a throttle opening sensor, which is provided for detecting a throttle opening α of throttle valve 06, a vehicle speed sensor, a range gear position switch, a drive-shaft angular position sensor 28, a control-shaft angular position sensor 29, a cam angle sensor for the exhaust-valve camshaft, boost pressure sensor 09, intake-pipe pressure sensor 010, A/F sensor 012, an airflow sensor (not shown), an engine temperature sensor, and the like. Within ECU 22, the central processing unit (CPU) allows the access by the I/O interface of input informational data signals from the previously-discussed engine/vehicle switches and sensors. The processor of ECU 22 determines the current engine/vehicle operating condition, based on input information from the engine/vehicle switches and sensors. Crank angle sensor 27 is provided to detect an angular position (crankangle) of the crankshaft and engine speed Ne (revolutions per minute). The engine temperature sensor, such as an engine coolant temperature sensor, is provided for sensing the actual operating temperature of the engine. Drive-shaft angular position sensor 28 is provided for detecting an angular position of drive shaft 6. Also, based on both of the sensor signals from crank angle sensor 27 and drive-shaft angular position sensor 28, an angular phase of drive shaft 6 relative to a timing sprocket 33, in other words, an actual phase of the intake-valve VTC mechanism 2, is detected. Control-shaft angular position sensor 29 (such as a potentiometer) is provided to detect an actual angular position of control shaft 17. The airflow meter is provided for measuring or detecting a quantity of air flowing through intake passage (intake pipe) 04, and consequently for detecting or estimating the magnitude of engine load. On the other hand, based on both of the sensor signals from crank angle sensor 27 and the cam angle sensor for the exhaust-valve camshaft, an angular phase of the exhaust-valve camshaft relative to a timing sprocket 60, in other words, an actual phase of the exhaust-valve VTC mechanism 3, is detected.

The CPU of ECU 22 is responsible for carrying the control program stored in memories and is capable of performing necessary arithmetic and logic operations, for example, throttle opening control achieved through the throttle actuator of the electronically-controlled throttle valve 06, electronic fuel injection control achieved by the electronic fuel-injection system, electronic spark control achieved by the electronic ignition system, valve lift and working angle control executed by the intake-valve VEL mechanism 1, phase control executed by the intake-valve VTC mechanism 2, and phase control executed by the exhaust-valve VTC mechanism 3. Computational results (arithmetic calculation results), that is, calculated output signals are relayed through the output interface circuitry of ECU 22 to output stages, namely, the throttle actuator of electronically-controlled throttle valve 06, electronically-controlled fuel injectors of the fuel-injection system, motor 20 of the intake-valve VEL mechanism 1, an electromagnetic solenoid of a directional control valve 47 (described later) for the intake-valve VTC mechanism 2, and an electromagnetic solenoid of a directional control valve (described later) for the exhaust-valve VTC mechanism 3, the electromagnetic clutch of supercharger 07, and the bypass valve actuator of bypass valve 08a. More concretely, depending on the current engine operating condition determined based on latest up-to-date information data signals, a throttle control current for the throttle actuator, a motor control current for motor 20 of the intake-valve VEL mechanism 1, a solenoid control current applied to the electromagnetic solenoid of directional control valve 47 for the intake-valve VTC mechanism 2, and a solenoid control current applied to the electromagnetic solenoid of the directional control valve for the exhaust-valve VTC mechanism 3 are feedback-controlled, while monitoring the actual angular position of control shaft 17 of the intake-valve VEL mechanism 1, the actual phase of the intake-valve VTC mechanism 2, and the actual phase of the exhaust-valve VTC mechanism 3.

Hereunder described briefly in reference to FIGS. 2, 3A-3B, 4A-4B, and 5 is the operation of the intake-valve VEL mechanism 1. Suppose that, responsively to a control signal generated from the output interface circuitry of ECU 22 under a given engine operating condition, motor 20 of VEL mechanism 1 is driven in one rotation direction. Thus, ball-screw shaft 23 is rotated in its one rotation direction by input torque created by motor 20, thereby producing a rectilinear motion of ball nut 24 in one ball-nut axial direction that ball nut 24 approaches close to motor 20. As a result, control shaft 17 rotates in its one rotational direction via a linkage comprised of link member 26 and link arm 25.

Figure 3A:
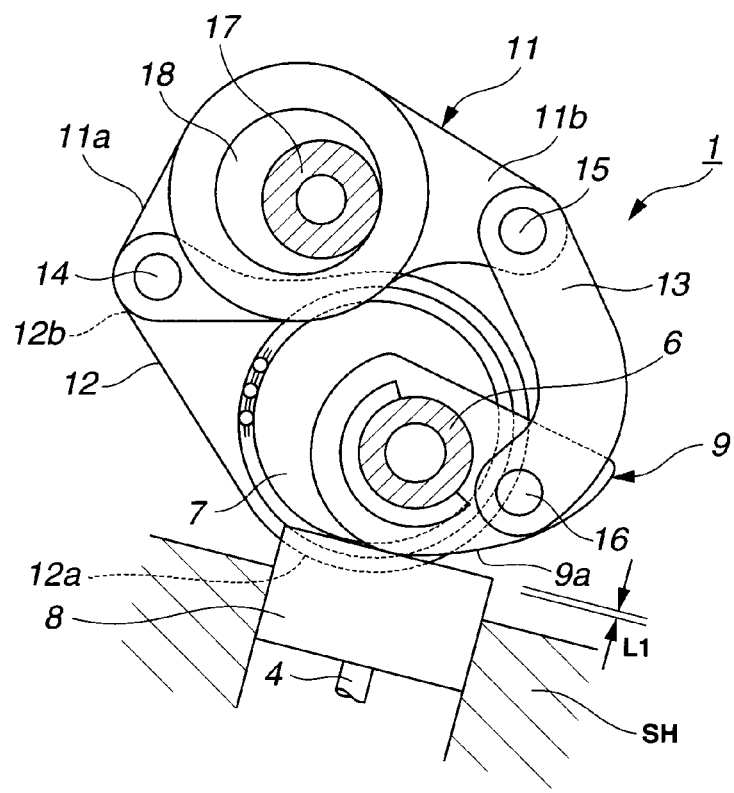
FIGS. 3A-3B are explanatory views illustrating the operation of an intake-valve VEL mechanism, included in the variable valve actuation system of the first embodiment, at a small lift control mode.
Figure 3B:
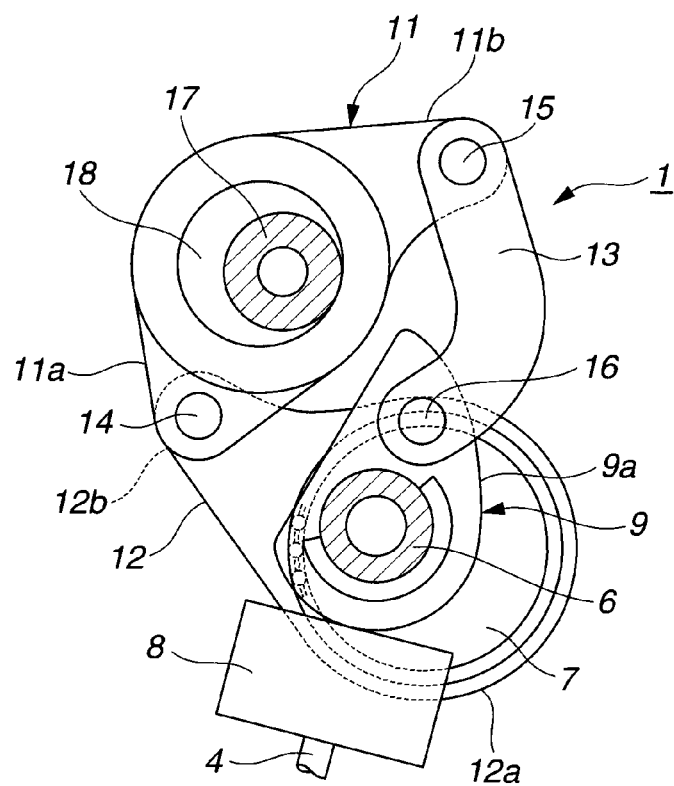

As can be seen from the angular position of control cam 18 shown in FIGS. 3A-3B (the axial rear views), by way of revolving motion of the center of control cam 18 around the center of control shaft 17, the radially thick-walled portion of control cam 18 shifts upwards apart from drive shaft 6 and is held at the upwardly shifted position, with the result that the pivot (the connected point by connecting pin 15) between the second arm portion 11b of rocker arm 11 and the first rod end 13a of link rod 13 also shifts upwards with respect to drive shaft 6. As a result, the cam-nose portion of each of rockable cams 9, 9 is forcibly pulled up via the second rod end 13b of link rod 13. As viewed from the rear end of drive shaft 6, the angular position of each rockable cam 9 shown in FIGS. 3A-3B is relatively shifted to the counterclockwise direction from the angular position of each rockable cam 9 shown in FIGS. 4A-4B.

With control cam 18 held at the angular position shown in FIGS. 3A-3B, when drive cam 7 is rotated, a rotary motion of drive cam 7 is converted through link arm 12, the first arm portion 11a of rocker arm 11, the second arm portion 11b of rocker arm 11, and link rod 13 into an oscillating motion of rockable cam 9, but almost the base-circle surface area of rockable cam 9 is brought into sliding-contact with the upper contact surface of valve lifter 8 (see FIGS. 3A-3B). Thus, the actual intake-valve lift becomes a small lift L1 and simultaneously the actual intake-valve working angle becomes a small working angle D1 (see the small intake-valve lift L1 and small working angle D1 characteristic shown in FIG. 5). The above small working angle D1 substantially corresponds to one-half of an intake-valve open period in terms of crankangle.

As seen from the valve-clearance line indicated by the one-dotted horizontal line in FIG. 5, there is a valve clearance between rockable cam 9 and valve lifter 16. The valve lift amount is smaller than the cam lift amount by such a valve clearance. As can be appreciated from the valve-clearance line (indicated by the one-dotted line) and a phase-advanced valve closure timing PI shown in FIG. 5, in the shown embodiment intake valve closure timing IVC of each of intake valves 4, 4 is defined as a position at which the intake valve seats, whereas intake valve open timing IVO is defined as a position at which the intake valve is lifted from its seat. That is, the working angle of intake valve 4 is defined as a lifted period from intake valve open timing IVO to intake valve closure timing IVC.

Suppose that, responsively to a control signal generated from the output interface circuitry of ECU 22 under another engine operating condition, motor 20 of VEL mechanism 1 is driven in the reverse-rotational direction. Thus, ball-screw shaft 23 is also rotated in the reverse-rotational direction by reverse-rotation of the motor output shaft of motor 20, thereby producing the opposite rectilinear motion of ball nut 24 in the opposite ball-nut axial direction that ball nut 24 moves apart from motor 20. As a result, control shaft 17 rotates in the opposite rotation direction via the linkage (25, 26).

By way of revolving motion of the center of control cam 18 around the center of control shaft 17, the radially thick-walled portion of control cam 18 slightly downwardly shifts toward drive shaft 6 and is held at the slightly downwardly shifted position. Thus, the attitude of rocker arm 11 slightly shifts clockwise from the angular position of rocker arm 11 shown in FIGS. 3A-3B, with the result that the pivot (the connected point by connecting pin 15) between the second arm portion 11*b* of rocker arm 11 and the first rod end 13*a* of link rod 13 also shifts slightly downwards. As a result, the cam-nose portion of each of rockable cams 9, 9 is forcibly slightly pushed down via the second rod end 13*b* of link rod 13. As viewed from the rear end of drive shaft 6, the angular position of each rockable cam 9 is relatively shifted to the clockwise direction from the angular position of each rockable cam 9 shown in FIGS. 3A-3B.

Figure 4A:
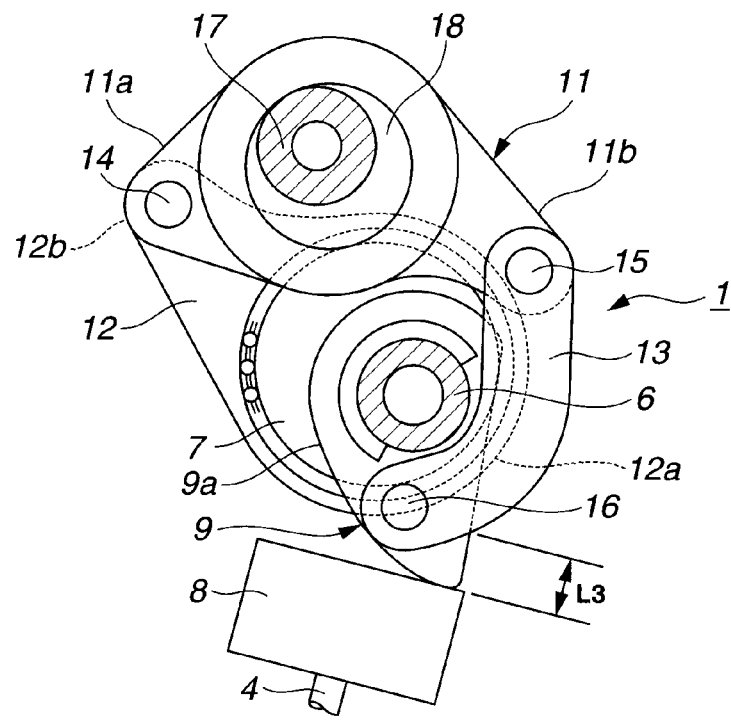
FIGS. 4A-4B are explanatory views illustrating the operation of the intake-valve VEL mechanism at a large lift control mode.
Figure 4B:
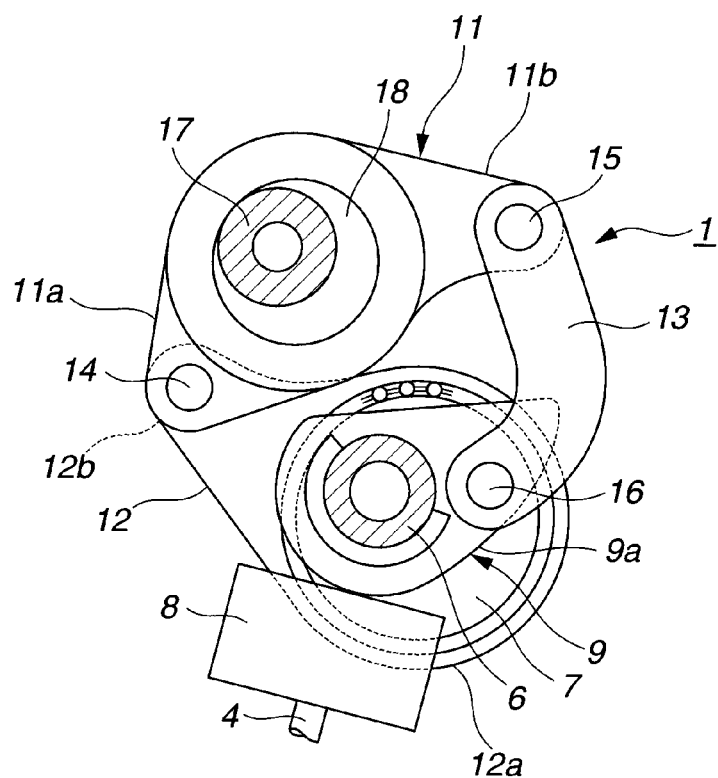

With control cam 18 shifted from the angular position shown in FIGS. 3A-3B to the intermediate angular position located in a substantially middle of the angular position shown in FIGS. 3A-3B and the angular position shown in FIGS. 4A-4B, during rotation of drive cam 7, a rotary motion of drive cam 7 is converted through link arm 12, the first armed portion 11*a* of rocker arm 11, the second armed portion 11*b* of rocker arm 11, and link rod 13 into an oscillating motion of rockable cam 9. At this time, a part of the base-circle surface area, the ramp surface area, the lift surface area, and the top surface area are brought into sliding-contact with the upper contact surface of valve lifter 8. Thus, when varying from the angular position of control cam 18 shown in FIGS. 3A-3B to the intermediate angular position, the actual intake-valve lift and working angle characteristic can be quickly varied from the small intake-valve lift L1 and small working angle D1 characteristic to a middle intake-valve lift L2 and middle working angle D2 characteristic (see FIG. 5). That is, intake-valve working angle as well as intake-valve lift can be simultaneously increased. Owing to a valve lift increase (L1→L2) and a working angle increase (D1→D2), intake valve closure timing IVC is phase-retarded and controlled to a timing near the piston bottom dead center (BDC) position. Thus, an effective compression ratio becomes high to ensure good combustion, in particular, during cold start operation. Additionally, a charging efficiency of fresh air tends to become high, thus resulting in an increase in torque generated by combustion and a smooth rise in engine speed, and consequently ensuring and realizing complete explosion with satisfactory combustion of the compressed air-fuel mixture.

After this, when the engine/vehicle operating condition is shifting to a high-speed high-load range, motor 20 is further driven in the reverse-rotational direction responsively to a control signal, which is generated from the output interface circuitry of ECU 22 and determined based on the high-speed and high-load condition. Thus, ball-screw shaft 23 is further rotated in the reverse-rotational direction by reverse-rotation of the motor output shaft of motor 20, thereby producing the further opposite rectilinear motion of ball nut 24. As a result, control shaft 17 further rotates in the opposite rotation direction via the linkage (25, 26). By way of further revolving motion of the center of control cam 18 around the center of control shaft 17, the radially thick-walled portion of control cam 18 further shifts downwards and is held at the downwardly shifted position. Thus, the attitude of rocker arm 11 further shifts clockwise, with the result that the pivot (the connected point by connecting pin 15) between the second arm portion 11*b* of rocker arm 11 and the first rod end 13*a* of link rod 13 further shifts downwards. As a result, the cam-nose portion of each of rockable cams 9, 9 is further forcibly pushed down via the second rod end 13*b* of link rod 13. As viewed from the rear end of drive shaft 6, the angular position of each rockable cam 9 is further shifted clockwise. With control cam 18 shifted to the angular position (suited to high-speed high-load operation) shown in FIGS. 4A-4B, during rotation of drive cam 7, a rotary motion of drive cam 7 is converted through the motion transmitting mechanism (links 11, 12, and 13) into an oscillating motion of rockable cam 9. At this time, a part of the base-circle surface area, the ramp surface area, the lift surface area, and the top surface area are brought into sliding-contact with the upper contact surface of valve lifter 8. Thus, when switching from the intermediate angular position (suited to middle load operation) of control cam 18 to the angular position (suited to high load operation) shown in FIGS. 4A-4B, the actual intake-valve lift and working angle characteristic can be continuously varied from the middle intake-valve lift L2 and middle working angle D2 characteristic to a large intake-valve lift L3 and large working angle D3 characteristic (see FIG. 5). As a result, it is possible to enhance the charging efficiency of intake air in the high-speed high-load range, thus effectively increasing engine power output.

As can be appreciated from a plurality of intake-valve lift L and intake-valve working angle D characteristic curves (or a plurality of intake-valve lift L and lifted-period D characteristic curves) shown in FIG. 5, according to VEL mechanism 1 incorporated in the variable valve actuation system of the first embodiment, through all engine operating conditions ranging from a low to a high engine load, the intake-valve lift and working angle characteristic can be continuously controlled or adjusted from the small intake-valve lift L1 and working angle D1 characteristic via the middle intake-valve lift L2 and working angle D2 characteristic to the large intake-valve lift L3 and working angle D3 characteristic, or vice versa. That is to say, the intake-valve lift and working angle characteristic can be controlled or adjusted to an optimal characteristic suited to the latest up-to-date information concerning engine operating condition.

Furthermore, as described previously, in the engine stopped state, by virtue of the two opposing spring forces of first and second coil springs 30-31, ball nut 24 is stably held at the axial intermediate position of ball-screw shaft 23 (i.e., in a middle valve lift L2 and middle working angle D2 range between the minimum and maximum valve lift characteristics). Accordingly, in the engine stopped state, intake valve closure timing IVC is mechanically returned to a timing near the piston BDC position, by means of the ball-nut return-to-neutral mechanism containing two return springs 30-31.

Figure 6:
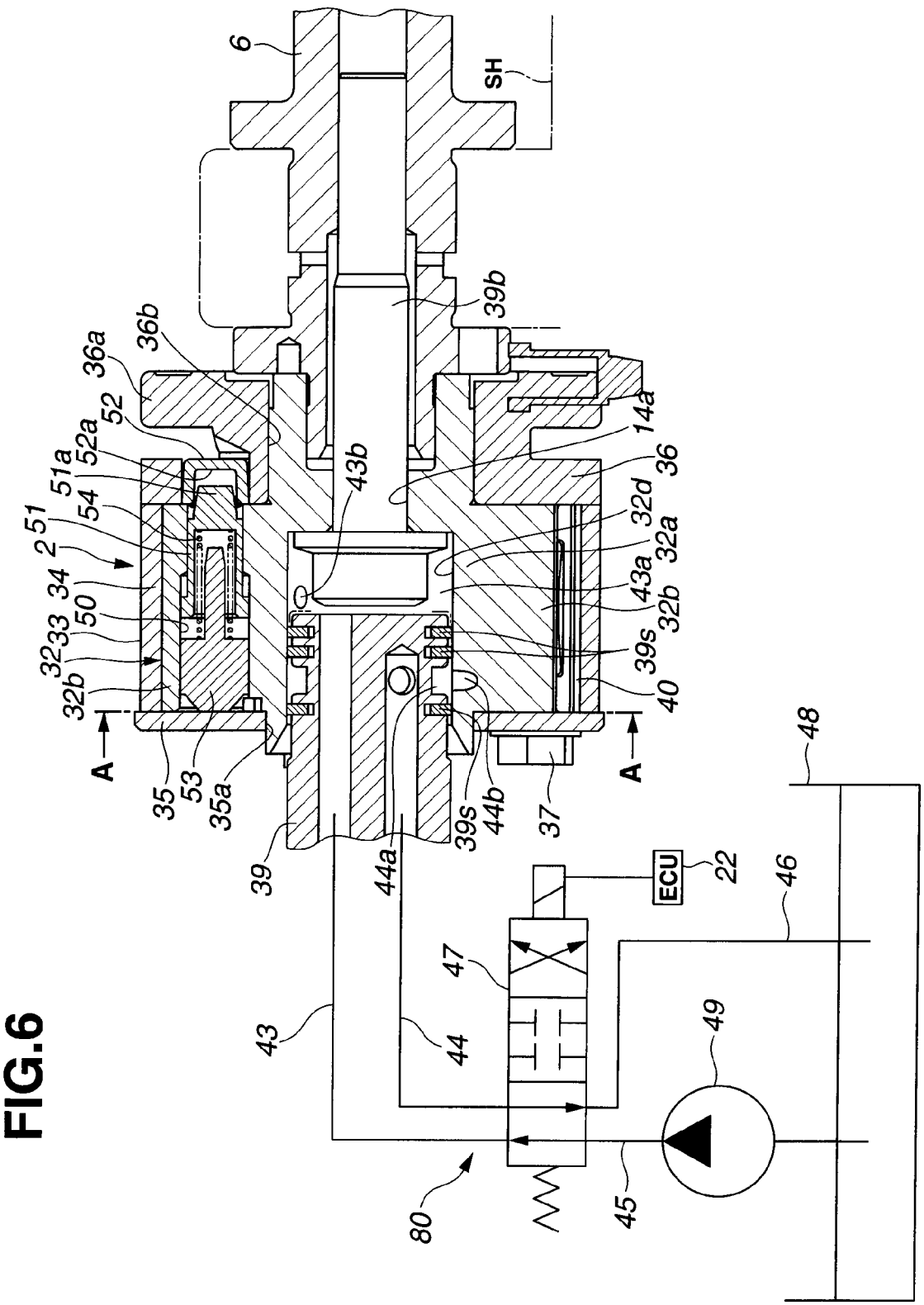
FIG. 6 is a longitudinal cross-sectional view illustrating an intake-valve VTC mechanism, included in the variable valve actuation system of the first embodiment.
Figure 7:
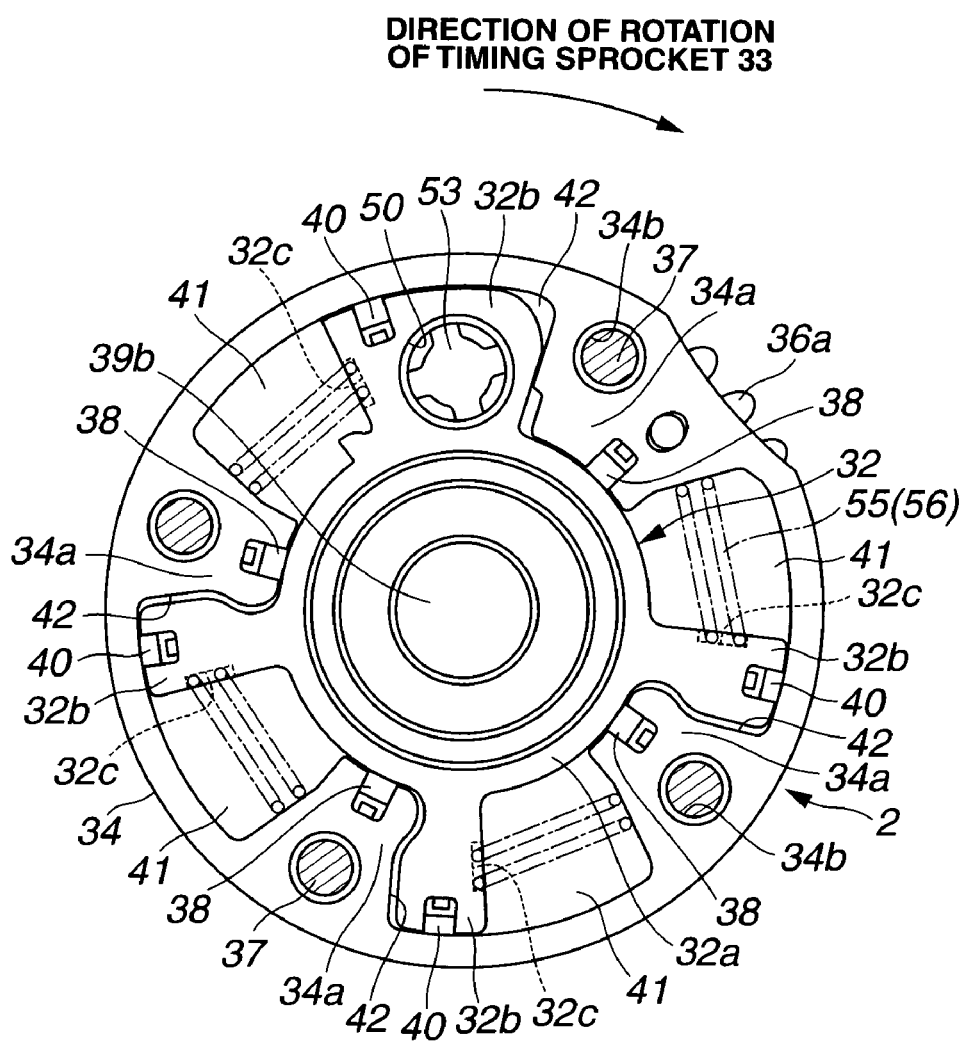
FIG. 7 is a lateral cross-sectional view illustrating the maximum phase-advance control state of the intake-valve VTC mechanism, taken along the line A-A of FIG. 6.

In the shown embodiment, the previously-described intake-valve VTC mechanism 2 comprises a so-called hydraulically-operated rotary vane type VTC mechanism. As shown in FIGS. 6 and 7, VTC mechanism 2 is comprised of timing sprocket 33 fixedly connected to drive shaft 6 for torque transmission, a four-blade vane member 32 fixedly connected or bolted to the shaft end of drive shaft 6 and rotatably accommodated in the internal space of timing sprocket 33, and a hydraulic circuit 80, which hydraulically operates vane member 32 in a manner so as to rotate vane member 32 in the selected direction of normal-rotational and reverse-rotational directions.

Timing sprocket 33 is comprised of a substantially cylindrical, phase-converter housing 34 rotatably accommodating therein vane member 32, a disk-shaped front cover 35 hermetically covering the front opening end of housing 34, and a disk-shaped rear cover 36 hermetically covering the rear opening end of housing 34. Housing 34 and front and rear covers 35-36 are axially connected integral with each other by tightening four bolts 37.

Housing 34 is substantially cylindrical in shape and opened at both axial ends. Housing 34 has four shoes 34a, 34a, 34a, 34a evenly spaced around its entire circumference and serving as four partition walls radially inwardly extending from the inner periphery of the housing.

Each of shoes 34a is frusto-conical (or trapezoidal) in shape, and has an axially-extending bolt insertion hole 34b formed in its substantially central portion such that bolt 37 is inserted into the bolt insertion hole. As best seen in FIG. 7, each of shoes 34a has an axially-elongated seal groove formed in its apex. Four elongated oil seals 38, 38, 38, 38, each having a substantially C-shape in lateral cross section, are fitted into and retained in the respective seal grooves of shoes 34a. Although it is not clearly shown in FIG. 7, actually, four leaf springs are fitted into and retained in the respective seal grooves of shoes 34a in such a manner as to radially inwardly force the respective oil seals 38 against the outer peripheral wall surface of a vane rotor 32a (described later).

The previously-noted disk-shaped front cover 35 has a comparatively large-diameter center supporting bore 35a and circumferentially equidistant-spaced bolt holes (not numbered) bored to axially conform to the respective bolt insertion holes 34b of shoes 34a of housing 34.

The previously-noted disk-shaped rear cover 36 is integrally formed at its rear end with a toothed portion 36a, which is in meshed-engagement with the timing chain. Also, rear cover 36 has a substantially center bearing bore 36b having a comparatively large diameter.

Vane member 32 is comprised of a substantially annular ring-shaped vane rotor 32a formed with a center bolt insertion hole and radially-extending four vanes or blades 32b, 32b, 32b, 32b evenly spaced around the entire circumference of vane rotor 32a and integrally formed on the outer periphery of vane rotor 32a.

A small-diameter, cylindrical-hollow front end portion of vane rotor 32a is rotatably supported in the center bore 35a of front cover 35. A small-diameter, cylindrical-hollow rear end portion of vane rotor 32a is also rotatably supported in the bearing bore 36b of rear cover 36.

Vane rotor 32a of vane member 32 has an axially-extending central bore 14a into which a vane mounting bolt 39b is inserted for bolting vane member 32 to the front axial end of drive shaft 6 by axially tightening vane mounting bolt 39b.

One of four vane blades 32b, 32b, 32b, 32b is configured to have an inverted frusto-conical shape in lateral cross section, whereas the remaining three vane blades are configured to be substantially rectangular in lateral cross section. The remaining three blades have almost the same circumferential width and the same radial length. The circumferential width of the one blade having the inverted frusto-conical shape is dimensioned to be greater than that of each of the remaining three rectangular blades, taking account of total weight balance of vane member 32, in other words, reduced rotational unbalance of vane member 32 having four blades 32b.

Each of four blades 32b, 32b, 32b, 32b is disposed in an internal space defined between the associated two adjacent shoes 34a and 34a. As best seen in FIG. 7, four apex seals 40, 40, 40, and 40, each being substantially C-shaped in lateral cross section, are fitted into and retained in respective seal grooves formed in apexes of four blades 32b, so that each of blades 32b is slidable along the inner peripheral wall surface of phase-converter housing 34. Although it is not clearly shown in FIG. 7, actually, four leaf springs are fitted into and retained in the respective seal grooves of the apexes of blades 32b in such a manner as to radially inwardly force the respective apex seals 40 against the inner peripheral wall surface of housing 34. The backward sidewall surface of each blade 32b, opposing to the rotational direction of drive shaft 6, is formed with substantially circular, two concave grooves 32c and 32c, which serve as spring retaining holes for two rows of return springs 55-56. Return springs 55-56 are disposed between the spring-retaining-hole equipped backward sidewall surface of blade 32b and a spring-retaining sidewall surface of shoe 34a opposing to the backward sidewall surface of blade 32b.

Four blades 32b of vane member 32 and four shoes 34a of housing 34 cooperate with each other to define four variable-volume phase-advance chambers 41 and four variable-volume phase-retard chambers 42. In more detail, each of phase-advance chambers 41 is defined between the spring-retaining-hole equipped backward sidewall surface of blade 32b and the opposing spring-retaining sidewall surface of shoe 34a. Each of phase-retard chambers 42 is defined between the non-spring-retaining-hole equipped forward sidewall surface of blade 32b and the opposing non-spring-retaining sidewall surface of shoe 34a.

As clearly shown in FIG. 6, hydraulic circuit 80 is comprised of a first hydraulic line 43 provided to supply and exhaust working fluid (hydraulic pressure) to and from each of phase-advance chambers 41, and a second hydraulic line 44 provided to supply and exhaust working fluid (hydraulic pressure) to and from each of phase-retard chambers 42. That is, hydraulic circuit 80 comprises a dual hydraulic line system (43, 44). Each of hydraulic lines 43 and 44 are connected through an electromagnetic solenoid-operated directional control valve 47 to a working-fluid supply passage 45 and a working-fluid drain passage 46. A one-way oil pump 49 is disposed in supply passage 45 for sucking working fluid in an oil pan 48 and for discharging the pressurized working fluid from its discharge port. The downstream end of drain passage 46 communicates oil pan 48.

First and second hydraulic lines 43 and 44 are formed in a substantially cylindrical flow-passage structure 39. One end (i.e., a first end) of flow-passage structure 39 is inserted through the left-hand axial opening end of the small-diameter, cylindrical-hollow front end portion of vane rotor 32a into a cylindrical bore 32d formed in vane rotor 32a. The other end (i.e., a second end) of flow-passage structure 39 is connected to electromagnetic solenoid-operated directional control valve 47. Three annular seals 39s, 39s, 39s are disposed between the outer periphery of the first end of flow-passage structure 39 and the inner periphery of cylindrical bore 32d of vane rotor 32a. In more detail, annular seals 39s are fitted into and retained in respective seal grooves formed in the outer periphery of the first end of flow-passage structure 39. These annular seals 39s act to partition between a phase-advance-chamber communication port of first hydraulic line 43 and a phase-retard-chamber communication port of second hydraulic line 44 in a fluid-tight fashion.

First hydraulic line 43 is further provided with a working-fluid chamber 43a and four branch passages 43b, 43b, 43b, 43b. First hydraulic line 43 penetrates through the first end face of flow-passage structure 39, and the axial passage of first hydraulic line 43 communicates working-fluid chamber 43a. Working-fluid chamber 43a is formed as the inner half of cylindrical bore 32d of vane rotor 32a, facing drive shaft 6. Four branch passages 43b are formed in vane rotor 32a in such a manner as to substantially radially extend from the inner periphery of cylindrical bore 32d. Four phase-advance chambers 41 are communicated with working-fluid chamber 43a via respective branch passages 43b.

On the other hand, the axial passage of second hydraulic line 44 extends near the first end face of flow-passage structure 39. Second hydraulic line 44 is further provided with an annular chamber 44a and a second working-fluid passage 44b. Annular chamber 44a is formed in the outer periphery of the cylindrical portion of the first end of flow-passage structure 39. Although it is not clearly shown in the drawing, second working-fluid passage 44b has a substantially L shape and formed in vane rotor 32a. Annular chamber 44a and each of phase-retard chambers 42 are communicated with each other via second working-fluid passage 44b.

In the shown embodiment, the electromagnetic solenoid-operated directional control valve 47 is constructed by a four-port, three-position, spring-offset solenoid-actuated directional control valve. Directional control valve 47 uses a sliding valve spool to change the path of flow through the directional control valve. For a given position of the valve spool, a unique flow path configuration exists within the valve. Concretely, directional control valve 47 of the intake-valve VTC mechanism 2 is designed to switch among three positions of the spool, namely a spring-offset position shown in FIG. 6, a block-off position (a center position created due to the balancing opposing forces, that is, the return spring force and the electromagnetic force produced by the solenoid), and a fully solenoid-actuated position. In the spring-offset position (corresponding to the parallel flow path configuration in graphic symbol), fluid communication between first hydraulic line 43 and supply passage 45 is established, and fluid communication between second hydraulic line 44 and drain passage 46 is established. In the block-off position (corresponding to the central flow-path shut-off configuration in graphic symbol), fluid communication between each of first and second hydraulic lines 43-44 and each of supply passage 45 and drain passage 46 is blocked. In the fully solenoid-actuated position (corresponding to the crossed flow path configuration in graphic symbol), fluid communication between first hydraulic line 43 and drain passage 46 is established, and fluid communication between second hydraulic line 44 and supply passage 45 is established. Switching operation among the three positions of the valve spool of directional control valve 47 is executed responsively to a control command signal generated from the output interface circuitry of ECU 22 to the solenoid.

The controller (ECU) 22 is common to the intake-valve VEL mechanism 1, the intake-valve VTC mechanism 2, and the exhaust-valve VTC mechanism 3. As previously described, the processor of ECU 22 is configured to determine, based on latest up-to-date information data signals from the engine/vehicle sensors, the current engine operating condition. The processor of ECU 22 is further configured to determine, based on both of the sensor signals from crank angle sensor 27 and drive-shaft angular position sensor 28, an angular phase of drive shaft 6 relative to timing sprocket 33.

Regarding the intake-valve VEL mechanism 1, with directional control valve 47 switched to its neutral position, there is no positive working-fluid supply to variable-volume phase-advance chambers 41 and variable-volume phase-retard chambers 42, and thus the angular position of vane member 32 is kept unchanged.

Also provided is a lock mechanism (or an interlocking device or interlocking means) disposed between vane member 32 and housing 34, for disabling rotary motion of vane member 32 relative to housing 34 by locking and engaging vane member 32 with housing 34, and for enabling rotary motion of vane member 32 relative to housing 34 by unlocking (or disengaging) vane member 32 from housing 34.

As can be seen from the longitudinal cross section of FIG. 6, the lock mechanism (interlocking means) is comprised of a lock-pin sliding-motion permitting bore (simply, a lock-pin bore) 50, a lock pin 51, an engaging-hole structural member 52 having a substantially C shape in lateral cross section and press-fitted into a through hole formed in rear cover 36, an engaging hole 52a defined in the C-shaped engaging-hole structural member 52, a spring retainer 53, and a return spring (a coiled compression spring) 54. Lock-pin bore 50 is formed in the inverted frusto-conical blade 32b of the relatively greater circumferential width (the maximum circumferential width) and formed in rear cover 36, such that lock-pin bore 50 extends in the axial direction of drive shaft 6. Lock pin 51 is slidably accommodated in lock-pin bore 50 and has a cylindrical bore closed at one end. A tapered head portion 51a of lock pin 51 is engaged with or disengaged from engaging hole 52a. Spring retainer 53 is fitted into a space defined by the inner peripheral wall surface of front cover 35 and lock-pin bore 51. Return spring 54 is provided to permanently force lock pin 51 toward the internal space of engaging hole 52a. Although it is not clearly shown in FIG. 6, the phase-converter housing structure, constructed by front and rear covers 35-36 and cylindrical housing 34, is also designed to supply working oil (hydraulic pressure) in phase-advance chamber 41 and/or working oil (hydraulic pressure) discharged from oil pump 49 via an oil hole formed in the phase-converter housing structure into engaging hole 52a.

Lock pin 51 operates to disable relative rotation between timing sprocket 33 and drive shaft 6 by locking and engaging tapered head portion 51a of lock pin 51 with engaging hole 52a in a predetermined position where vane member 32 reaches its maximum phase-advance position, by the spring force of return spring 54. Relative rotation between timing sprocket 33 and drive shaft 6 is enabled by unlocking (or disengaging) tapered head portion 51a of lock pin 51 from engaging hole 52a by the hydraulic pressure delivered from phase-advance chamber 41 and/or oil pump 49 into engaging hole 52a. That is, tapered head portion 51a of lock pin 51 is forced out of engaging hole 52a under hydraulic pressure fed into the engaging hole from phase-advance chamber 41 and/or oil pump 49.

As previously described with reference to FIG. 7, two rows of return springs 55-56, each of which serves as a biasing device or biasing means, are disposed between the spring-retaining-hole equipped backward sidewall surface of blade 32b and the spring-retaining sidewall surface of shoe 34a, for permanently biasing the associated blade 32b (vane member 32) toward the phase-advance side. In the shown embodiment, return springs 55-56 are constructed by coil springs having the same size and the same spring stiffness.

Figure 8:
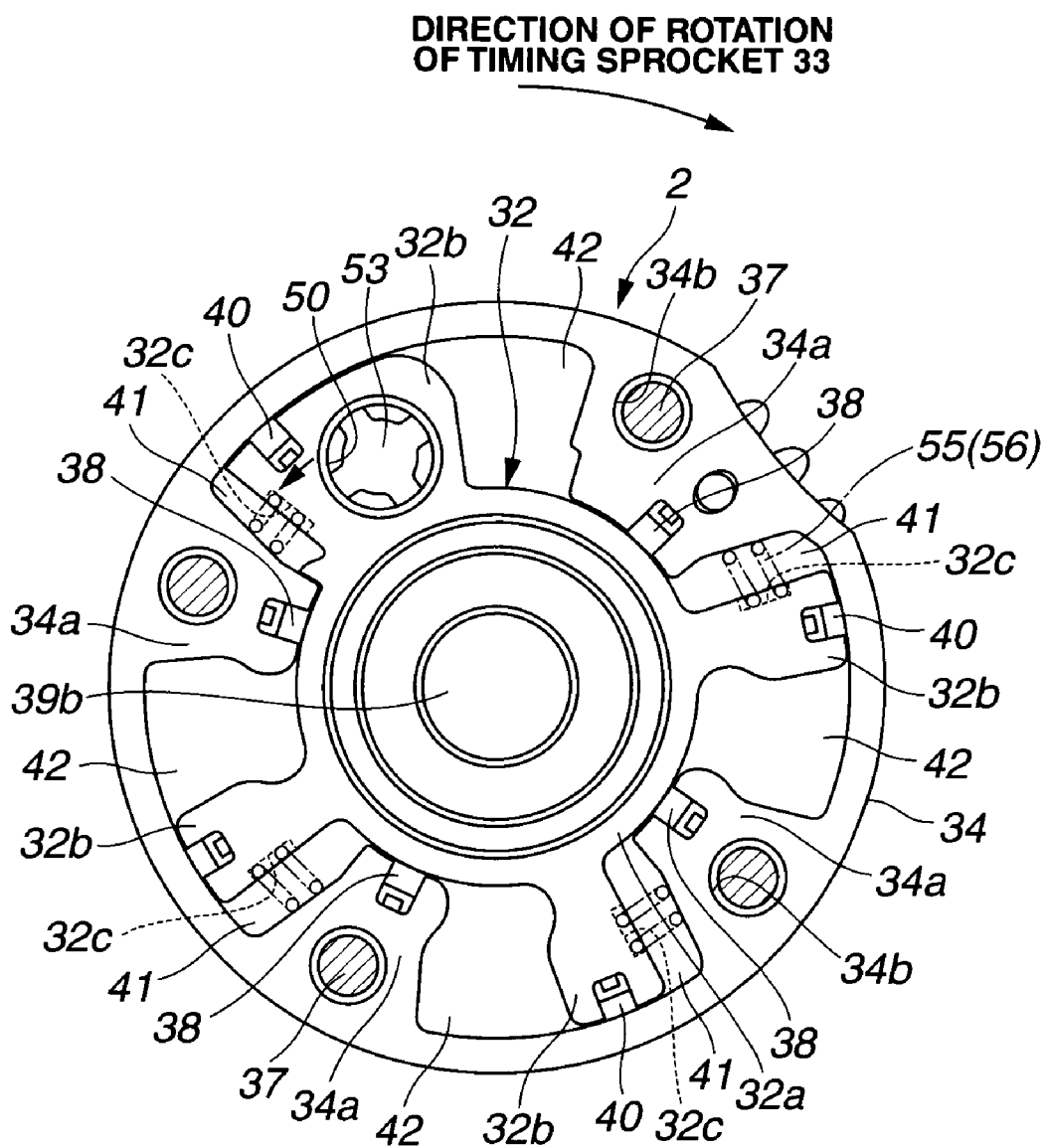
FIG. 8 is a lateral cross-sectional view illustrating the maximum phase-retard control state of the intake-valve VTC mechanism, taken along the line A-A of FIG. 6.

As shown in FIGS. 7-8, two return springs 55-56 are disposed in parallel with each other. As can be seen from the lateral cross section of FIG. 7, the axial length of each of springs 55-56 is dimensioned to be greater than the circumferential distance between the spring-retaining-hole equipped backward sidewall surface of blade 32b and the spring-retaining sidewall surface of shoe 34a with the blade 32b held at the maximum phase-advance position. Return springs (coil springs) 55-56 have the same free height.

The distance between the axes of two parallel coil springs 55-56 is preset to a predetermined distance that the outer peripheries of coil springs 55-56 are not brought into contact with each other under a condition of maximum compressive deformation of each of coil springs 55-56 (see FIG. 8). One end of each of coil springs 55-56, facing the associated blade 32b, is retained in a thin-plate spring retainer (not shown) fitted to concave groove (spring retaining hole) 32c.

Hereinafter described in detail is the fundamental operation of the intake-valve VTC mechanism 2, normally operating without any fault.

When the engine is shifted to a stopped state, the output of control current (exciting current) from ECU 22 to the solenoid of directional control valve 47 is also stopped. Thus, the valve spool of directional control valve 47 is shifted to its spring-offset position (a "default" position) at which fluid communication between first hydraulic line 43 and supply passage 45 is established, and simultaneously fluid communication between second hydraulic line 44 and drain passage 46 is established. Thus, vane member 32 tends to rotate towards the phase-advance side, but hydraulic pressure supplied from oil pump 49 and acting on blades 32b of vane member 32 becomes zero owing to a gradual fall in engine speed to essentially zero speed.

Under these conditions, as shown in FIG. 7, vane member 32 rotates clockwise, that is, in the rotation direction (indicated by the arrow in FIG. 7) of drive shaft 6, by way of the spring forces of return springs 55-56. Therefore, the inverted frusto-conical vane blade 32b of the maximum circumferential width is brought into abutted-engagement with the sidewall of shoe 34a facing phase-retard chamber 42. At the same time, tapered head portion 51a of lock pin 51 is brought into engagement with engaging hole 52a by the spring force of return spring 54, in such a manner as to disable relative rotation between timing sprocket 33 and drive shaft 6. In this manner, vane member 32 is stably held at the maximum phase-advance angular position. That is, the intake-valve VTC mechanism 2 is designed or configured such that its "default" position is stabilized mechanically at the maximum phase-advance position.

Next, during an engine starting period, with an ignition switch (not shown) turned ON, a starter motor (not shown) is driven to initiate cranking operation for the engine crankshaft. At such an early stage of cranking, ECU 22 begins to output a control signal to the solenoid of directional control valve 47. However, at the early stage of cranking, a rise in discharge pressure from oil pump 49 is insufficient. Thus, vane member 32 remains kept at the maximum phase-advance side by means of the lock mechanism and by the spring forces of return springs 55-56.

At this time, (at the early stage of cranking), the valve spool of directional control valve 47 still remains kept at the spring-offset position (the "default" position) at which fluid communication between first hydraulic line 43 and supply passage 45 is established, and simultaneously fluid communication between second hydraulic line 44 and drain passage 46 is established. Due to a rise in hydraulic pressure of working fluid discharged from oil pump 49, the hydraulic pressure is fed through first hydraulic line 43 to each of phase-advance chambers 41. In a similar manner to the engine stopped state, at the early stage of cranking, there is no supply of hydraulic pressure to each of phase-retard chambers 42, since the hydraulic pressure in each of phase-retard chambers 42 is maintained at their low-pressure states owing to the hydraulic-pressure relief from drain passage 46 to oil pan 48.

After the hydraulic pressure of working fluid discharged from oil pump 49 has risen up to a sufficient pressure level, the intake-valve VTC system enables satisfactory vane angular-position control through the use of electromagnetic directional control valve 47. For instance, under the idling state after engine warm-up, the solenoid of directional control valve 47 is shifted to its fully solenoid-actuated position responsively to a control signal from ECU 22 such that fluid communication between second hydraulic line 44 and supply passage 45 is established and fluid communication between first hydraulic line 43 and drain passage 46 is established. Under these conditions, on the one hand, hydraulic pressure produced by oil pump 49 is supplied through supply passage 45 and second hydraulic line 44 into each of phase-retard chambers 42. On the other hand, there is no supply of hydraulic pressure to each of phase-advance chambers 41. That is, hydraulic pressure is relieved from each of phase-advance chambers 41 through first hydraulic line 43 and drain passage 46 into oil pan 48 and thus the hydraulic pressure in each of phase-advance chambers 41 is kept low. Approximately at the same time, working fluid, supplied into phase-retard chamber 42, is also delivered from phase-retard chamber 42 into engaging hole 52a. As a result, lock pin 51 moves backwards against the spring bias of return spring 54 and then tapered head portion 51a of lock pin 51 is forced out of engaging hole 52a. Therefore, vane member 32 is unlocked or disengaged from the stationary housing 34. Due to a rise in hydraulic pressure in phase-retard chamber 42, vane member 32 rotates counterclockwise (see FIG. 8) against the spring forces of return springs 55-56. This causes drive shaft 6 to rotate relative to timing sprocket 33 in the phase-retard side.

Thereafter, the vehicle begins to run and engine warm-up further develops. As soon as a predetermined low-speed middle-load range has been reached, the spool of directional control valve 47 is shifted to its spring-offset position responsively to a control signal from ECU 22, to establish fluid communication between first hydraulic line 43 and supply passage 45 and fluid communication between second hydraulic line 44 and drain passage 46.

Therefore, hydraulic pressure in each of phase-retard chambers 42 is relieved through second hydraulic line 44 and drain passage 46 into oil pan 48 and thus the hydraulic pressure in each of phase-retard chambers 42 becomes low. Conversely, the hydraulic pressure in each of phase-advance chambers 41 becomes high.

Thus, owing to a rise in hydraulic pressure in phase-advance chamber 41 and spring forces of return springs 55-56, vane member 32 rotates clockwise. This causes drive shaft 6 to rotate relative to timing sprocket 33 in the phase-advance side.

When shifting the engine operating condition from the low speed range to the middle speed range, and further shifting to the high speed range, owing to a fall in hydraulic pressure supplied to phase-advance chamber 41 and a rise in hydraulic pressure in phase-retard chamber 42, vane member 32 rotates counterclockwise against the spring forces of return springs 55-56. As a result of this, the relative phase between timing sprocket 33 and drive shaft 6 is changed to the phase-retard side (see FIG. 8). Under these conditions, as soon as the valve spool of directional control valve 47 becomes shifted to its neutral position (i.e., a shut-off position), the angular position of vane member 32 is held. In this manner, by controlling the valve spool of directional control valve 47 to its neutral position when vane member 32 has been shifted to an arbitrary angular position between the maximum phase-advance position (see FIG. 7) and the maximum phase-retard position (see FIG. 8), it is possible to hold vane member 32 at this arbitrary position.

Figure 9:
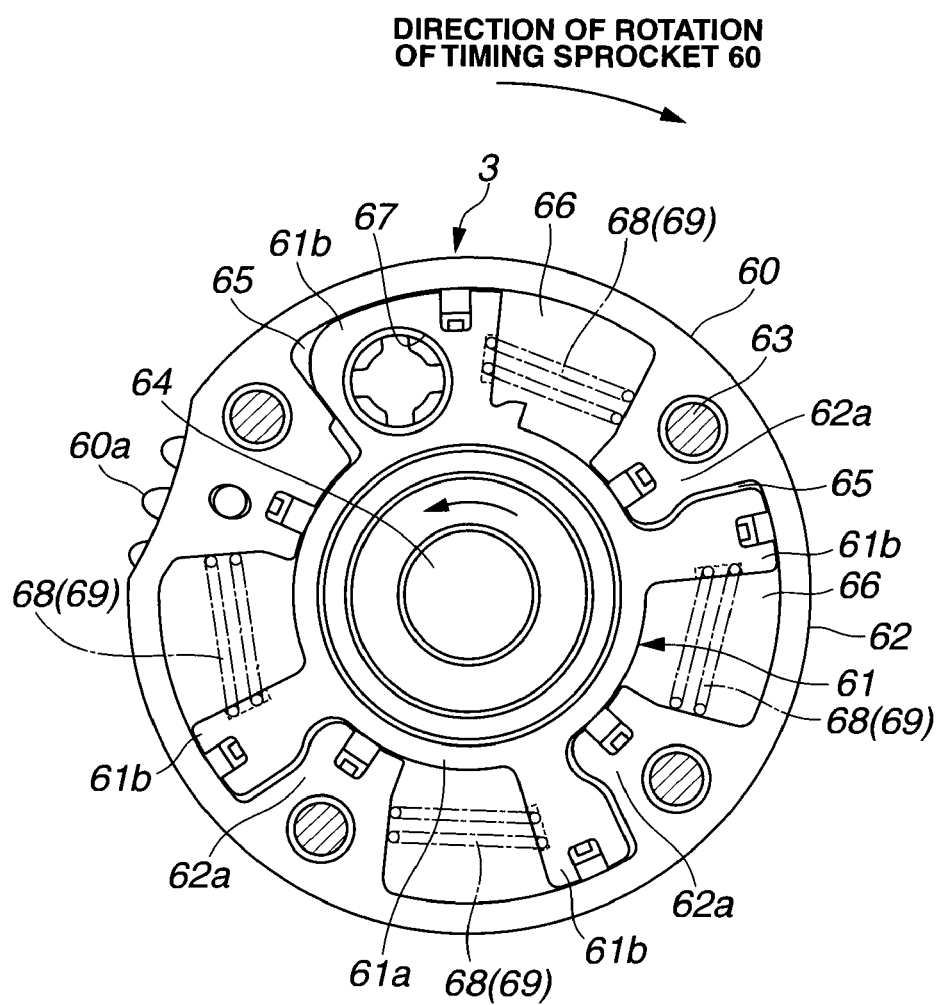
FIG. 9 is a lateral cross-section of an exhaust-valve VTC mechanism, included in the variable valve actuation system of the first embodiment.

The fundamental configuration of the previously-described exhaust-valve VTC mechanism 3 is similar to the intake-valve VTC mechanism 2. That is, in the shown embodiment, the exhaust-valve VTC mechanism 3 also comprises a so-called hydraulically-operated rotary vane type VTC mechanism. Thus, the configuration of the exhaust-valve VTC mechanism 3 is hereunder described briefly by reference to the lateral cross section of FIG. 9. As seen in FIG. 9, the exhaust-valve VTC mechanism 3 is comprised of timing sprocket 60 fixedly connected to the exhaust-valve camshaft for torque transmission, a four-blade vane member 61 fixedly connected or bolted to the shaft end of the exhaust-valve camshaft and rotatably accommodated in the internal space of timing sprocket 60, and a hydraulic circuit, which hydraulically operates vane member 61 in a manner so as to rotate vane member 61 in the selected direction of normal-rotational and reverse-rotational directions.

Timing sprocket 60 is comprised of a phase-converter housing 62 rotatably accommodating therein vane member 61, a disk-shaped front cover (not shown) hermetically covering the front opening end of housing 62, and a disk-shaped rear cover (not shown) hermetically covering the rear opening end of housing 62. Housing 62 and the front and rear covers are axially connected integral with each other by tightening four bolts 63. Housing 62 is substantially cylindrical in shape and opened at both axial ends. Housing 62 has four shoes 62*a*, 62*a*, 62*a*, 62*a* evenly spaced around its entire circumference and serving as four partition walls radially inwardly extending from the inner periphery of the housing. The previously-noted disk-shaped rear cover of VTC mechanism 3 is integrally formed at its rear end with a toothed portion 60*a*, which is in meshed-engagement with the timing chain.

Vane member 61 is comprised of a substantially annular ring-shaped vane rotor 61*a* formed with a center bolt insertion hole and radially-extending four vanes or blades 61*b*, 61*b*, 61*b*, 61*b* evenly spaced around the entire circumference of vane rotor 61*a* and integrally formed on the outer periphery of vane rotor 61*a*.

Vane rotor 61*a* of vane member 61 has an axially-extending central bore into which a vane mounting bolt 64 is inserted for bolting vane member 61 to the front axial end of the exhaust-valve camshaft by axially tightening vane mounting bolt 64. Two rows of return springs 68-69 are disposed between the spring-retaining-hole equipped backward sidewall surface of blade 61*b* and the spring-retaining sidewall surface of shoe 62*a* opposing to the backward sidewall surface of blade 61*b*. Four blades 61*b* of vane member 61 and four shoes 62*a* of housing 62 cooperate with each other to define four variable-volume phase-advance chambers 65 and four variable-volume phase-retard chambers 66.

The fundamental circuit configuration of the hydraulic circuit of the exhaust-valve VTC mechanism 3 is similar to hydraulic circuit 80 of the intake-valve VTC mechanism 2. However, regarding three envelope configurations, the four-port, three-position, spring-offset solenoid-actuated directional control valves of these two VTC mechanisms 2-3 somewhat differ from each other, in that the left envelope configuration of the electromagnetic directional control valve of the exhaust-valve VTC mechanism 3 is replaced with the right envelope configuration (i.e., the crossed flow path configuration in graphic symbol) of directional control valve 47 of the intake-valve VTC mechanism 2, whereas the right envelope configuration of the electromagnetic directional control valve of the exhaust-valve VTC mechanism 3 is replaced with the left envelope configuration (i.e., the parallel flow path configuration in graphic symbol) of directional control valve 47 of the intake-valve VTC mechanism 2. In more detail, the hydraulic circuit of the exhaust-valve VTC mechanism 3 is comprised of a first hydraulic line provided to supply and exhaust working fluid (hydraulic pressure) to and from each of phase-advance chambers 65, and a second hydraulic line provided to supply and exhaust working fluid (hydraulic pressure) to and from each of phase-retard chambers 66. That is, the hydraulic circuit of the exhaust-valve VTC mechanism 3 comprises a dual hydraulic line system (the first and second hydraulic lines). Each of these two hydraulic lines are connected through the electromagnetic solenoid-operated directional control valve of VTC mechanism 3 to a working-fluid supply passage and a working-fluid drain passage. A one-way oil pump is disposed in the supply passage for sucking working fluid in the oil pan and for discharging the pressurized working fluid from its discharge port. The downstream end of the drain passage communicates the oil pan.

Concretely, the directional control valve of the exhaust-valve VTC mechanism 3 is designed to switch among three positions of the spool, namely a spring-offset position, a block-off position (a center position created due to the balancing opposing forces, that is, the return spring force and the electromagnetic force produced by the solenoid), and a fully solenoid-actuated position. In the spring-offset position (corresponding to the crossed flow path configuration in graphic symbol) at which there is no exciting current flow through the electromagnetic solenoid of VTC mechanism 3, the supply passage is communicated with each of phase-retard chambers 66 via the second hydraulic line, whereas the drain passage is communicated with each of phase-advance chambers 65 via the first hydraulic line. In this manner, under a specific condition where there is no exciting-current supply to the solenoid of the directional control valve of the exhaust-valve VTC mechanism 3, the exhaust-valve VTC system is configured so that the valve spool mechanically returns to its spring-offset position by means of the spring force of the return spring. That is, a "default" position of the exhaust-valve VTC mechanism 3 corresponds to such a spring-offset position where fluid communication between the supply passage and each of phase-retard chambers 66 via the second hydraulic line is established, and simultaneously fluid communication between the drain passage and each of phase-advance chambers 65 via the first hydraulic line is established. In the block-off position (corresponding to the central flow-path shut-off configuration in graphic symbol), fluid communication between each of the first and second hydraulic lines and each of the supply passage and the drain passage is blocked. In the fully solenoid-actuated position (corresponding to the parallel flow path configuration in graphic symbol), fluid communication between the first hydraulic line and the supply passage is established, and fluid communication between the second hydraulic line and the drain passage is established. Switching operation among the three positions of the valve spool of the directional control valve of the exhaust-valve VTC mechanism 3 is executed responsively to a control command signal generated from the output interface circuitry of ECU 22 to the solenoid.

Also provided is a lock mechanism (or an interlocking device or interlocking means) disposed between vane member 61 and housing 62, for disabling rotary motion of vane member 61 relative to housing 62 by locking and engaging vane member 61 with housing 62, and for enabling rotary motion of vane member 61 relative to housing 62 by unlocking (or disengaging) vane member 61 from housing 62. As can be seen from the lateral cross section of FIG. 9, the lock mechanism (interlocking means) is comprised of at least a lock-pin sliding-motion permitting bore (simply, a lock-pin bore) 67, a lock pin, and a return spring (a coiled compression spring). Lock-pin bore 67 is formed in the inverted frusto-conical blade 61*b* of the relatively greater circumferential width (the maximum circumferential width) and formed in the rear cover, such that the lock-pin bore extends in the axial direction of the exhaust-valve camshaft. The lock mechanism of the exhaust-valve VTC mechanism 3 is configured so that the lock pin disables relative rotation between timing sprocket 60 and the exhaust-valve camshaft by locking and engaging the lock pin with its engaging hole in a predetermined position where vane member 61 reaches its maximum phase-retard position for instance in the engine stopped state, by the spring force of the return spring. Thus, vane member 61 can be held stably at the maximum phase-retard position by means of the lock mechanism.

As previously described, two rows of return springs 68-69, each of which serves as a biasing device or biasing means, are disposed between the spring-retaining-hole equipped backward sidewall surface of blade 61*b* and the spring-retaining sidewall surface of shoe 62*a*, for permanently biasing the associated blade 61*b* (vane member 61) toward the phase-retard side. In the shown embodiment, return springs 68-69 are constructed by coil springs having the same size and the same spring stiffness. When there is no hydraulic pressure supply from the oil pump to the supply passage before starting the engine, or when the hydraulic pressure supplied from the oil pump and acting on blades 61*b* of vane member 61 becomes less than a predetermined pressure level just after the engine has been started, return springs 68-69 forces vane member 61 anticlockwise (viewing FIG. 9) in such a manner as to rotate the exhaust-valve camshaft relative to the crankshaft in the maximum phase-retard direction, thus shifting an angular phase of the exhaust-valve camshaft to the maximum phase-retard side.

Hereinafter described briefly is the fundamental operation of the exhaust-valve VTC mechanism 3, normally operating without any fault.

Before starting the engine, in other words, after the engine has been stopped, the exhaust-valve VTC mechanism 3 is configured such that vane member 61 is mechanically stably held at the maximum phase-retard position (corresponding to the angular position shown in FIG. 9) by means of the lock mechanism as well as the spring forces of return springs 68-69. Hence, as seen from the lateral cross section of FIG. 9, a phase of exhaust valve open timing EVO and exhaust valve closure timing EVC of each of exhaust valves 5, 5, in other words, a phase of working angle of exhaust valve 5, corresponding to a phase angle at the maximum exhaust valve lift point, is mechanically stably held at the maximum phase-retard side.

On the other hand, as previously described, the intake-valve VTC mechanism 2 is configured such that vane member 32 is mechanically stably held at the maximum phase-advance position (corresponding to the angular position shown in FIG. 7) by means of the lock mechanism as well as the spring forces of return springs 55-56. Hence, as seen from the lateral cross section of FIG. 7, a phase of intake valve open timing IVO and intake valve closure timing IVC of each of intake valves 4, 4, in other words, a phase of working angle of intake valve 4, corresponding to a phase angle at the maximum intake valve lift point, is mechanically stably held at the maximum phase-advance side. Regarding the variable intake-valve actuation system that VTC mechanism 2 is combined with VEL mechanism 1, furthermore, the valve lift and working angle characteristic of each of intake valves 4, 4 is mechanically stably held at the intermediate position corresponding to the middle valve lift L2 and middle working angle D2 characteristic (somewhat scaled-down from the large valve lift L3 and large working angle D3 characteristic) by means of the ball-nut return-to-neutral mechanism (containing two return springs 30-31) of VEL mechanism 1.

Under these conditions, that is, before starting the engine, a valve overlap of intake valve 4 and exhaust valve 5 is set to a comparatively great value. On the other hand, intake valve closure timing IVC is mechanically held near the piston BDC position on the intake stroke, whereas exhaust valve open timing EVO is mechanically held near the piston BDC position on the exhaust stroke.

For the reasons discussed above, when the engine is started from cold by turning the ignition key ON, back-flow of part of high-temperature high-pressure combusted gases from the exhaust system through each of intake valves 4, 4 to the induction system (which is in the low-temperature and low-pressure state) occurs during the valve overlapping period, thus heating fresh air. That is, owing to the increased residual gases in the engine cylinder, fresh air can be heated. Thus, when starting a cold engine, it is possible to effectively reduce exhaust emissions, such as hydrocarbons (HCs), thereby improving or enhancing the exhaust-emission control performance.

Additionally, exhaust valve open timing EVO is controlled to the maximum phase-retard side, and held at the timing near the piston BDC position on the exhaust stroke. Thus, it is possible to promote combustion of hydrocarbons just before each of exhaust valves 5, 5 begins to open, thus more effectively reducing exhaust emissions.

Furthermore, intake valve closure timing IVC of each of intake valves 4, 4 is held at the timing near the piston BDC position on the intake stroke. Thus, an effective compression ratio becomes high to ensure good combustion. This contributes to the improved cold-engine startability, stable driveability (improved operational stability of the engine or stable engine speeds) during low-speed and low-load operation, and more enhanced exhaust-emission control performance.

When a complete explosion of the engine has been achieved after cranking and then the engine speed has been risen, the hydraulic pressure of working fluid discharged from oil pump 49 also rises. At this time, the hydraulic pressure in each of phase-advance chambers 41 of the intake-valve VTC mechanism 2 and the hydraulic pressure in each of phase-retard chambers 66 of the exhaust-valve VTC mechanism 3 sufficiently rise. Thus, the lock pins of the lock mechanisms built in the respective VTC mechanisms 2-3 are forced out of their engaging holes under hydraulic pressure fed into the engaging hole 52*a* from phase-advance chamber 41 (and/or oil pump 49) and under hydraulic pressure fed into the engaging hole from phase-retard chamber 66 (and/or oil pump 49). With the lock pins disengaged, vane member 32 of the intake-valve VTC mechanism 2 and vane member 61 of the exhaust-valve VTC mechanism 3 are permitted to rotate free of the respective phase-converter housings 34 and 62. Hence, the angular phase of vane member 32 (drive shaft 6) relative to housing 34 (timing sprocket 33) and the angular phase of vane member 61 (the exhaust-valve camshaft) relative to housing 62 can be controlled by means of ECU 22, depending on the more-recent engine operating condition determined based on latest up-to-date information data signals.

Figure 10:
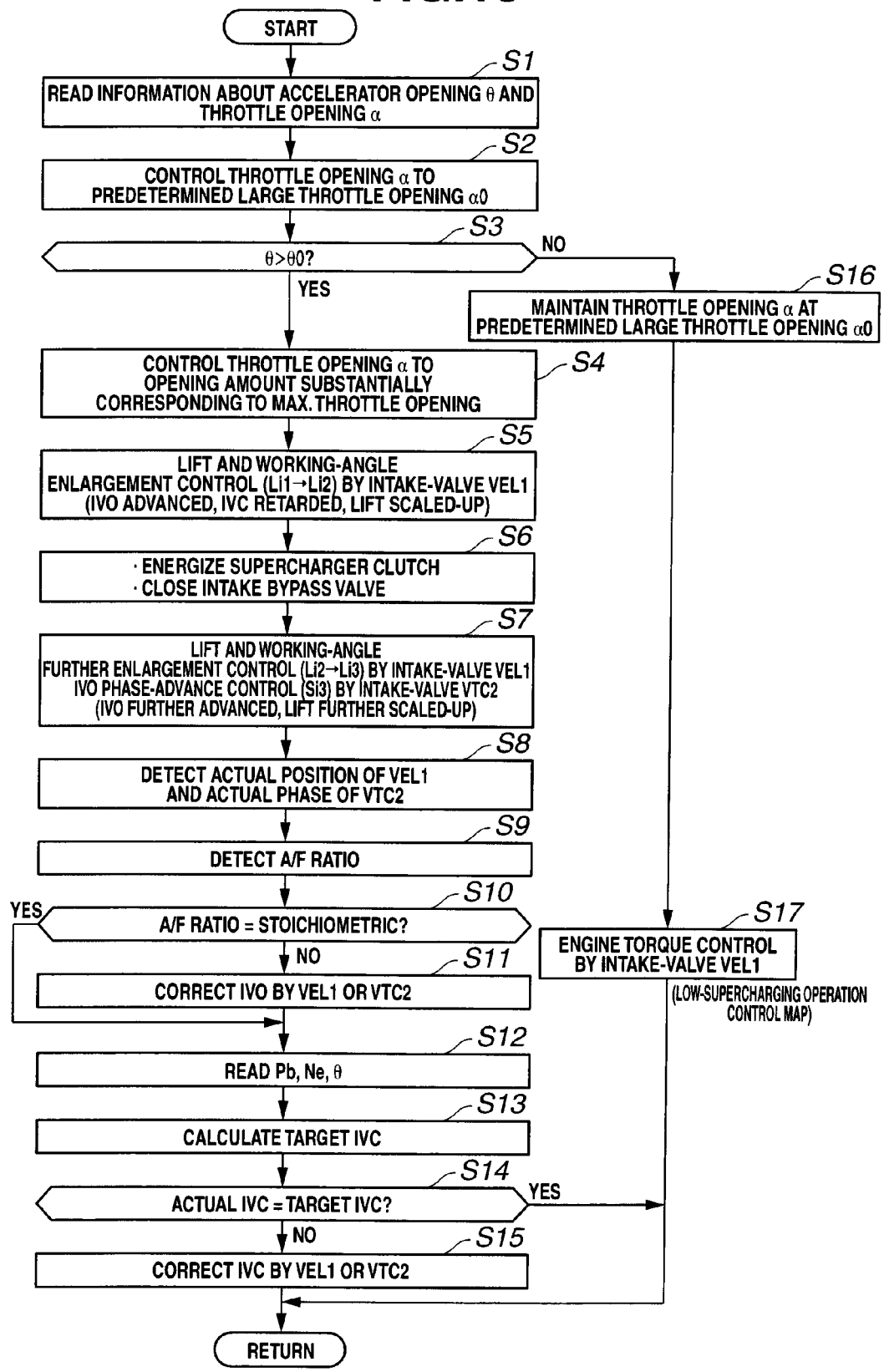
FIG. 10 is a flowchart illustrating a supercharged engine control routine, executed by a controller incorporated in the system of the first embodiment.

Referring now to FIG. 10, there is shown the supercharged engine control routine, executed by the controller (ECU) 22 incorporated in the system of the first embodiment, after the engine has been started.

At step S1, accelerator opening θ and throttle opening α are read.

At step S2, a throttle control signal is generated from ECU 22, so that throttle opening α of throttle valve 06 is controlled to a predetermined large throttle opening α0. This is because the engine torque output can be controlled to a desired small torque value, regardless of the throttle opening of throttle valve 06, by controlling the valve lift L and working angle D characteristic of each of intake valves 4, 4 to a small intake-valve lift and small working angle characteristic by means of the intake-valve VEL mechanism 1.

Here, the previously-noted predetermined throttle opening α0 means a large throttle opening amount that creates a minimum vacuum, which is required for the purpose of recirculation (ventilation) of blow-by fumes in a blowby-gas recirculation system and/or canister purging in an evaporative emission control system, and has a negative pressure (in intake passage 04) less than but near atmospheric pressure. Actually, extremely small adjustment of throttle opening α of throttle valve 06 to predetermined large throttle opening α0 can be made within a large throttle-opening range, while monitoring the sensor signal from intake-pipe pressure sensor 010.

At step S3, a check is made to determine whether accelerator opening θ is greater than a predetermined accelerator opening θ0. When the answer to step S3 is in the negative (NO), that is, when θ≦θ0, the processor of ECU 22 determines that a required engine torque is low and thus the routine proceeds from step S3 to step S16.

At step S16, throttle opening α is continually maintained at predetermined large throttle opening α0. Subsequently to step S16, step S17 occurs.

At step S17, the valve opening of each of intake valves 4, 4 is controlled by means of the intake-valve VEL mechanism 1, for the purpose of engine torque control. That is, at such an unthrottled (throttleless) condition (with throttle opening α kept at predetermined large throttle opening α0), a low fuel consumption rate operating mode is continually executed based on a non-supercharging operation control map (or a low-supercharging operation control map).

Conversely when the answer to step S3 is in the affirmative (YES), that is, when θ>θ0, the processor of ECU 22 determines that a required engine torque is high and thus the routine proceeds from step S3 to step S4.

At step S4, throttle opening α is controlled to an opening amount (a throttle opening degree or a throttle angle) substantially corresponding to the maximum throttle opening (a full-throttle condition).

Figure 11:
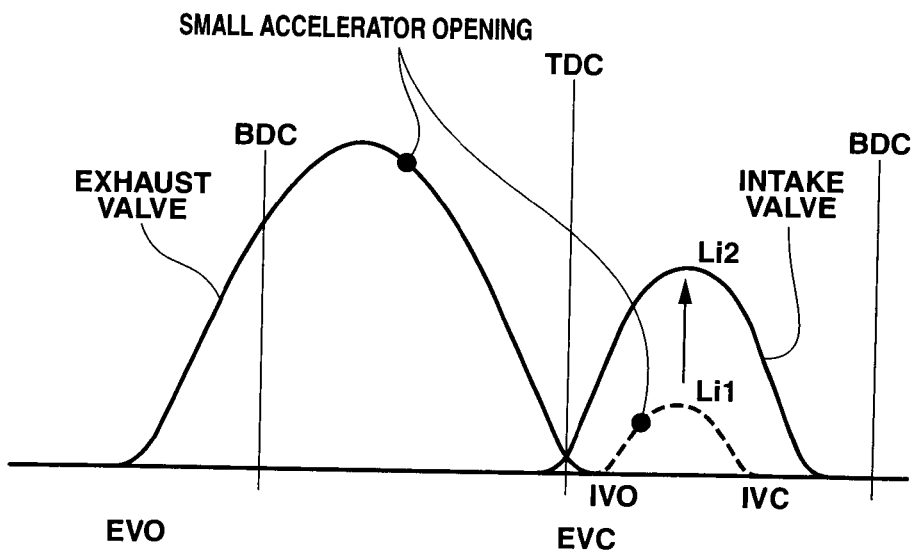
FIG. 11 is a valve lift characteristic diagram illustrating a change in the intake-valve lift characteristic, realized by lift and working-angle enlargement control (Li1→Li2) performed via the intake-valve VEL mechanism (related to step S5 of the routine of FIG. 10).

At step S5, ECU 22 outputs a control signal for lift and working-angle enlargement control for each of intake valves 4, 4 to the intake-valve VEL mechanism 1. That is, as can be appreciated from a scaled-up change (Li1→Li2) from a small lift and working angle characteristic curve Li1 indicated by the broken line in FIG. 11 to a middle lift and working angle characteristic curve Li2 indicated by the solid line in FIG. 11, ECU 22 outputs the control signal that intake valve open timing IVO of each of intake valves 4, 4 is phase-advanced, intake valve closure timing IVC is phase-retarded, and the intake-valve lift is scaled up.

By the way, regarding the pressure in intake passage 04, this internal pressure has already reached a pressure level substantially corresponding to atmospheric pressure from the point of time when accelerator opening θ is small (i.e., when θ≦θ0), because of the proper setting of throttle opening α to predetermined large throttle opening α0, as previously discussed. Under these conditions, assume that the working angle of each intake valve 4 is enlarged by the previously-noted lift and working angle enlargement control. In such a case, it is possible to effectively introduce fresh air into combustion chamber 03 without any delay in intake-air flow through intake passage 04, thus ensuring a rapid engine torque rise.

Figure 13:
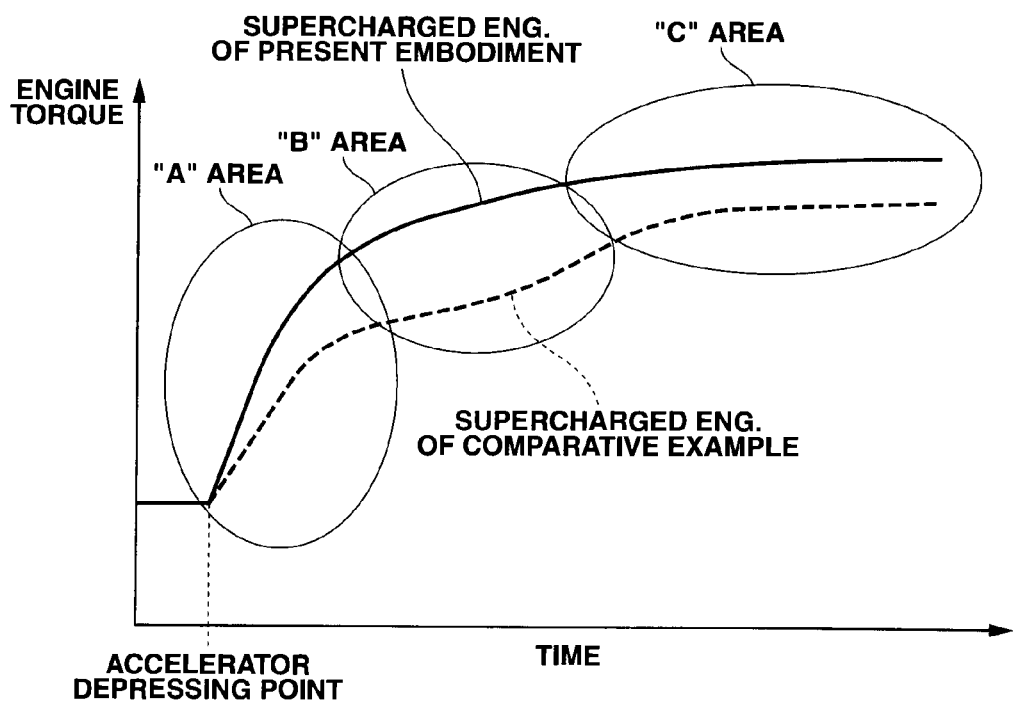
FIG. 13 is a comparative characteristic diagram illustrating the difference between an engine torque rise characteristic obtained by the system of the first embodiment and an engine torque rise characteristic obtained by the system (a comparative example) as disclosed in JP02-119641.

That is, as can be appreciated from the comparison result between the engine torque rise characteristic curve (indicated by the solid line) obtained by the system of the first embodiment and the engine torque rise characteristic curve (indicated by the broken line) obtained by the system (the comparative example) as disclosed in JP02-119641, within the "A" area of FIG. 13, the system of the first embodiment can realize a very quick engine torque rise. In contrast, in the case of the supercharged engine control system of the comparative example, in a non-load state (e.g., at idle) or in a light load state where the accelerator opening is small, the throttle opening is reduced to a small opening and as a result the intake pressure (the internal pressure in intake passage 04) becomes a great negative pressure (a high vacuum). Generally, when the engine is running with light loads, the supercharger clutch is de-energized to reduce the mechanical load and to permit air to be smoothly supplied through the bypass valve into the combustion chamber, thus ensuring stable engine revolutions. For the reasons discussed above, even during wide open throttle (WOT), there is a loss of time until the intake pressure reaches a pressure level corresponding to atmospheric pressure. Therefore, in the system of the comparative example, the engine torque rise tends to delay (see the moderate torque rise characteristic curve indicated by the broken line within the "A" area of FIG. 13). As described previously, in the supercharged engine control system of the first embodiment, even when accelerator opening θ is small (i.e., even when θ≦θ0), throttle opening α of throttle valve 06 is controlled to predetermined large throttle opening α0, and therefore the pressure in intake passage 04 has already reached a pressure level substantially corresponding to atmospheric pressure. Hence, assuming that accelerator opening θ changes from a small to a large opening and then the working angle of each of intake valves 4, 4 is enlarged (see the scaled-up change from the small lift and working angle characteristic curve Li1 indicated by the broken line in FIG. 11 to the middle lift and working angle characteristic curve Li2 indicated by the solid line in FIG. 11), there is no delay in fresh-air flow through intake passage 04, thus permitting a large amount of fresh air to be quickly introduced into combustion chamber 03. Thus, according to the system of the first embodiment, it is possible to effectively enhance the transient torque-increase responsiveness (at the early stage of vehicle acceleration) within the "A" area in FIG. 13.

At step S6, the electromagnetic clutch of supercharger 07 becomes energized (operated and engaged), and simultaneously intake bypass valve 08a becomes closed. At this time, a rapid increase in the mechanical load tends to occur. Therefore, as can be appreciated from the comparison result between the torque rise characteristic curve (indicated by the solid line) obtained by the system of the first embodiment and the torque rise characteristic curve (indicated by the broken line) obtained by the system of the comparative example, within the "B" area of FIG. 13, the system of the comparative example exhibits a stagnated or delayed torque-rise tendency, whereas the system of the first embodiment exhibits an enhanced torque-rise tendency. That is, in the system of the first embodiment, there is a less torque-rise stagnation even within the "B" area, in other words, just after the supercharger comes into operation.

Figure 12:
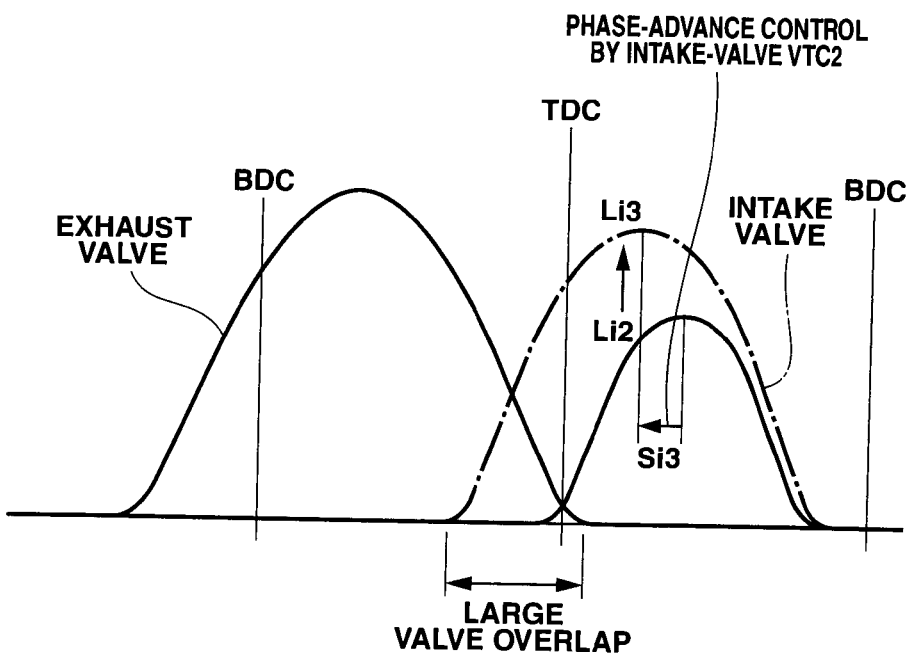
FIG. 12 is a valve lift characteristic diagram illustrating a change in the intake-valve lift characteristic, realized by lift and working-angle further enlargement control (Li2→Li3) and phase-advance control (Si3) performed via the respective intake-valve VEL and VTC mechanisms (related to step S7 of the routine of FIG. 10).

At step S7, ECU 22 outputs a control signal for lift and working-angle further enlargement control for each of intake valves 4, 4 to the intake-valve VEL mechanism 1, and simultaneously outputs a control signal for phase-advance control for intake valve open timing IVO to the intake-valve VTC mechanism 2. That is, as can be appreciated from a further scaled-up change (Li2→Li3) from the middle lift and working angle characteristic curve Li2 indicated by the solid line in FIG. 12 to a large lift and working angle characteristic curve Li3 indicated by the one-dotted line in FIG. 12 and an IVO phase advance (related to see a phase advance Si3 of the phase angle at the maximum lift point in FIG. 12), ECU 22 outputs the control signal that intake valve open timing IVO of each of intake valves 4, 4 is further phase-advanced, intake valve closure timing IVC is retained almost unchanged, and the intake-valve lift is further scaled up. By the lift and working angle further enlargement control (achieved by VEL1), it is possible to remarkably enhance the charging efficiency of intake air drawn into combustion chamber 03. By the IVO phase-advance control (achieved by VTC2), it is possible to increase the valve overlap. Therefore, by virtue of the scavenging effect of combusted gases, the residual gases near the piston TDC position on the exhaust stroke can be effectively pushed or forced into exhaust passage 05 by the boost pressure created by the supercharger, thus further enhancing the intake-air charging efficiency.

The reduced residual gases contribute to the enhanced antiknock property, and thus it is possible to enhance the engine torque output by advancing the ignition timing. Therefore, as can be appreciated from the torque rise characteristic curve (indicated by the solid line) obtained by the system of the first embodiment, throughout the "C" area (at the later stage of vehicle acceleration) of FIG. 13, it is possible to provide a good acceleration performance (or a good engine torque buildup).

At step S8, the actual angular position of control shaft 17 of the intake-valve VEL mechanism 1 and the actual phase of the intake-valve VTC mechanism 2 are detected based on sensor signals from crank angle sensor 27, drive-shaft angular position sensor 28, and control-shaft angular position sensor 29, such as a potentiometer.

At step S9, the air/fuel mixture ratio of exhaust gases is detected by means of A/F sensor 012. That is, in the case of an excessively large valve overlap, fresh air tends to further flow into the exhaust passage even after the residual gases have been scavenged or removed from combustion chamber 03, and thus the air/fuel mixture ratio tends to become lean (excess air). This deteriorates the invert ratio of nitrogen oxides (NOx), attained by three way catalytic converter 011, thereby undesirably increasing exhaust emissions.

For the reasons discussed above, at step S10, a check is made to determine whether the detected air/fuel mixture ratio is within a predetermined A/F ratio range defined by permissible upper and lower limits slightly deviated from a stoichiometric air/fuel ratio of 14.7:1. When the answer to step S10 is affirmative (YES), the routine proceeds from step S10 to step S12. Conversely when the answer to step S10 is negative (NO), that is, when ECU 22 determines that the detected air/fuel mixture ratio remarkably deviates from the stoichiometric ratio and shifts to lean (excess air), the routine proceeds from step S10 to step S11.

At step S11, in order to phase-retard intake valve open timing IVO, a phase of intake valve open timing IVO and intake valve closure timing IVC of each of intake valves 4, 4, in other words, a phase of working angle of intake valve 4, corresponding to a phase angle at the maximum intake valve lift point, is corrected or shifted to the phase-retard side, by means of the intake-valve VTC mechanism 2. In lieu thereof, for the same IVO phase-retard purpose, the lift and working-angle characteristic of intake valve 4 may be corrected or shifted to the small lift and working-angle characteristic, by means of the intake-valve VEL mechanism 1. In this manner, by phase-retarding intake valve open timing IVO, it is possible to reduce the valve overlap, thus effectively suppressing fresh air from flowing into the exhaust passage 05, and consequently suppressing exhaust emissions (e.g., NOx) from increasing.

In the shown embodiment, the electronically-controlled fuel injectors are provided in the respective combustion chambers 03. The injection timing of the fuel injector is set, so that fuel is injected or sprayed from the injector at the timing that exhaust valve 5 is not opened, and that unburned fuel is prevented from flowing into the exhaust passage during scavenging action. This prevents the catalytic converter from being damaged or deteriorated.

At step S12, boost pressure Pb created by supercharger 07 and detected by boost pressure sensor 09, engine speed Ne, and accelerator opening θ are read.

At step S13, a driver-required engine torque (a target engine torque) is computed or determined based on accelerator opening θ and engine speed Ne, whereas an estimated torque (regarded as an actual engine torque output) is determined based on boost pressure Pb and the current phase angle of drive shaft 6 of the intake-valve VTC system relative to timing sprocket 33 (that is, the actual phase of the intake-valve VTC mechanism 2 or the actual intake-valve timing). A deviation of the computed driver-required engine torque and the estimated torque is used as information on whether engine torque output should be increased or decreased. On the basis of the information (i.e., the deviation between the driver-required engine torque and the estimated torque) on whether engine torque output should be increased or decreased, a target intake valve closure timing (simply, target IVC) of each of intake valves 4, 4 is computed or determined.

At step S14, target IVC is compared to an actual intake valve closure timing (simply, actual IVC), which is determined based on the current phase angle of drive shaft 6 of the intake-valve VTC system relative to timing sprocket 33 (i.e., the actual phase of the intake-valve VTC mechanism 2). When actual IVC is identical to target IVC, the routine returns to step S1. Conversely when actual IVC is different from target IVC, the routine proceeds from step S14 to step S15.

At step S15, in order to correct intake valve closure timing IVC, either the intake-valve VEL mechanism 1 or the intake-valve VTC mechanism 2 is feedback-controlled so that actual IVC is brought closer to target IVC.

More concretely, when the driver-required torque is less than the estimated torque (regarded as the actual engine torque output), intake valve closure timing IVC is corrected in a manner as to phase-shift (phase-advance) away from the piston BDC position on the intake stroke, thereby reducing the intake-air charging amount and consequently realizing the required torque (low torque requirement) without reducing the valve opening of throttle valve 06 and/or without retarding the ignition timing. Therefore, it is possible to effectively suppress an increase in pumping loss and a deterioration in thermal efficiency, thus improving fuel economy. Additionally, by retarding the ignition timing, it is possible to prevent three way catalytic converter 011 from being deteriorated due to an abnormal catalyst temperature rise.

Conversely when the driver-required torque is higher than the estimated torque, intake valve closure timing IVC is corrected in a manner so as to phase-shift (phase-retard) towards the piston BDC position on the intake stroke, thereby increasing the intake-air charging amount and consequently realizing the required torque (high torque requirement). In this manner, engine torque correction can be appropriately achieved by phase-changing intake valve closure timing IVC of each of intake valves 4, 4 arranged closer to combustion chamber 03. Such engine torque correction based on IVC correction is advantageous with respect to a good acceleration response.

As discussed above, the supercharged engine control system of the first embodiment can ensure a good engine torque buildup throughout the "C" area (at the later stage of vehicle acceleration) of FIG. 13, in addition to a good acceleration response. Furthermore, the system of the first embodiment can suppress exhaust emissions (NOx) even after the engine torque buildup has been completed, thus improving fuel economy.

In particular, when accelerating the vehicle from a state where accelerator opening θ is a minimum opening amount, that is, when accelerating from vehicle stand-still, the system of the first embodiment can provide a superior acceleration response.

In contrast, in the case of the supercharged engine control system not employing an intake-valve variable valve event and lift (VEL) mechanism, when the accelerator opening is a minimum opening amount, e.g., during idling, the quantity of intake air supplied to combustion chamber 03 is greatly suppressed or reduced by means of the throttle valve and thus the intake pressure becomes a great negative pressure (a high vacuum). When accelerating from such a high-vacuum state, owing to a still low engine speed (little execution number of the repeatedly executed intake strokes per unit time) as well as such a great negative pressure (a high vacuum) in the intake passage, there is a comparatively great loss of time until the intake pressure reaches a pressure level corresponding to atmospheric pressure. This means a deteriorated transient acceleration response, in particular, when accelerating from vehicle stand-still.

On the other hand, in the case of the supercharged engine control system of the first embodiment, throttle opening α of throttle valve 06 is controlled to an opening amount substantially corresponding to the maximum throttle opening even during idling, since engine torque control can be achieved by the intake-valve VEL mechanism 1. Thus, at idle, the pressure in intake passage 04 has already reached a pressure level substantially corresponding to atmospheric pressure. Therefore, even under such an operating condition, that is, even when accelerating from the vehicle stand-still state (in other words, from the idling state where θ≦θ0), the system of the first embodiment can remarkably improve or enhance the transient acceleration response.

In the first embodiment, that is, in the case of the supercharged engine control system related to the control routine shown in FIG. 10, a series of steps S9-S11, related to IVO correction, is executed prior to a series of steps S12-S15, related to IVC correction. In lieu thereof, a series of steps S9-S11 (IVO correction) and a series of steps S12-S15 (IVC correction) may be executed simultaneously. As appreciated from the control routine of FIG. 10, executed within ECU 22 incorporated in the supercharged engine control system of the first embodiment, the exhaust-valve VTC mechanism 3 is kept in a non-controlled state. That is, in the system of the first embodiment, phase control for exhaust valves 5, 5, is not executed by means of VTC mechanism 3.

Second Embodiment

Figure 14:
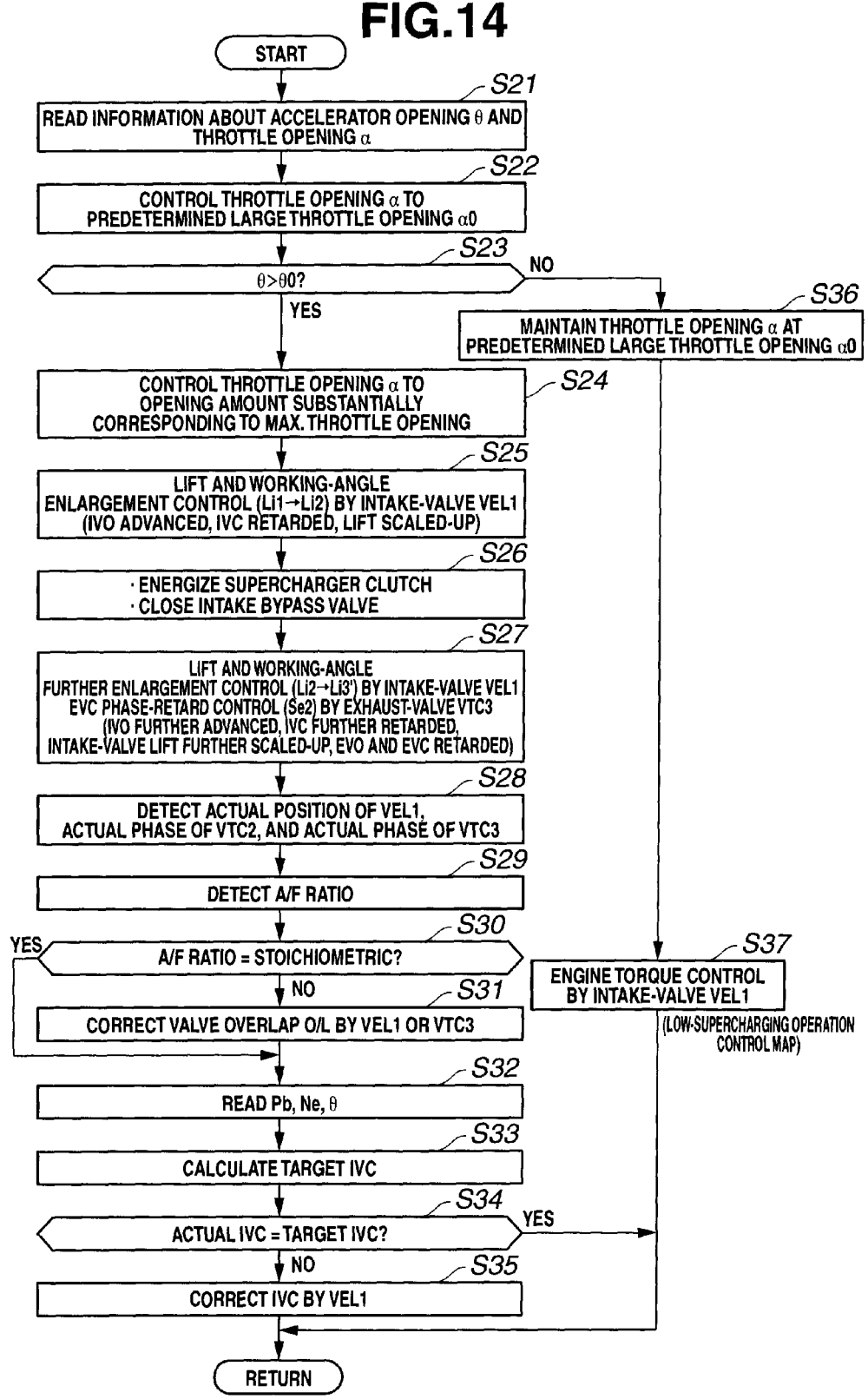
FIG. 14 is a flowchart illustrating a supercharged engine control routine, executed by a controller incorporated in the system of the second embodiment.

Referring now to FIG. 14, there is shown the supercharged engine control routine, executed by the controller incorporated in the system of the second embodiment, after the engine has been started. The system of the second embodiment slightly differs from that of the first embodiment, in that valve-overlap control (valve-overlap enlargement control) is achieved by exhaust valve closure timing EVC control (EVC phase-retard control) via the exhaust-valve VTC mechanism 3.

The control routine of FIG. 14 (the second embodiment) is somewhat different from the control routine of FIG. 10 (the first embodiment), in that steps S1-S6, S9-S10, S12-S14, and S16-S17 included in the routine shown in FIG. 10 are identical to respective steps S21-S26, S29-S30, S32-S34, and S36-S37 included in the routine shown in FIG. 14, but steps S7-S8, S11, and S15 included in the routine shown in FIG. 10 are replaced with steps S27-S28, S31, and S35 included in the routine shown in FIG. 14.

Figure 15:
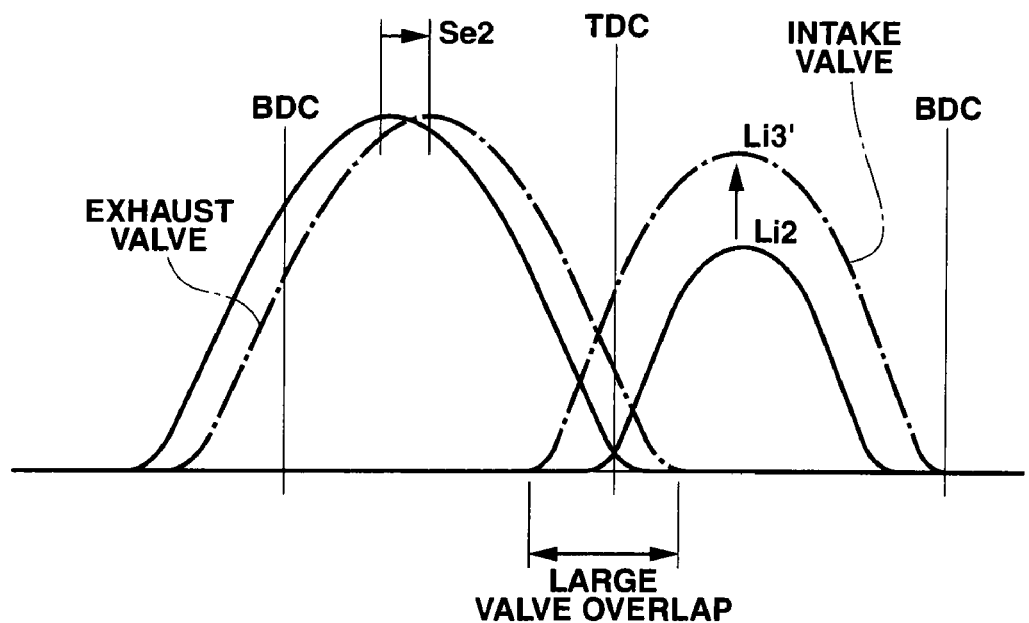
FIG. 15 is a valve lift characteristic diagram illustrating a change in the intake-valve lift characteristic, realized by lift and working-angle further enlargement control (Li2→Li3') performed via the intake-valve VEL mechanism, and a change in the exhaust-valve lift characteristic, realized by phase-retard control (Se2) performed via the exhaust-valve VTC mechanism (related to step S27 of the routine of FIG. 14).

As seen from the flow from step S21 through steps S22-S25 to step S26 in FIG. 14, after the engine torque has been risen, the electromagnetic clutch of supercharger 07 becomes energized (engaged) and simultaneously intake bypass valve 08a becomes closed (see step S26). In the same manner as step S5, at step S25, lift and working-angle enlargement control for each of intake valves 4, 4 is executed by means of the intake-valve VEL mechanism 1, such that a scaled-up change (Li1→Li2) from the small lift and working angle characteristic curve Li1 to the middle lift and working angle characteristic curve Li2 (indicated by the solid line in FIG. 15) occurs.

The timing that energizes (or engages) the supercharger clutch is set to a point of time when accelerator opening θ exceeds predetermined accelerator opening θ0 and thereafter lift and working-angle enlargement control for each of intake valves 4, 4 has been executed via the intake-valve VEL mechanism 1. In lieu thereof, the timing that energizes the supercharger clutch may be set to a point of time when engine speed Ne exceeds a predetermined speed value Ne01 or when the lift amount of each of intake valves 4, 4 exceeds a predetermined lift amount L01 or when accelerator opening θ exceeds a predetermined accelerator opening θ01 (above predetermined accelerator opening θ0). For instance, suppose that the supercharger clutch becomes energized at the time when the lift amount of each of intake valves 4, 4 reaches the predetermined lift amount L01. In such a case, an engine torque, produced at the point of time when the supercharger clutch has been energized, is stable, thus enhancing the acceleration stability.

At step S27, ECU 22 outputs a control signal for lift and working-angle further enlargement control for each of intake valves 4, 4 to the intake-valve VEL mechanism 1 in order to enhance the charging efficiency of intake air drawn into combustion chamber 03, and simultaneously outputs a control signal for phase-retard control for exhaust valve closure timing EVC to the exhaust-valve VTC mechanism 3. That is, as can be appreciated from a further scaled-up change (Li2→Li3') from the middle lift and working angle characteristic curve Li2 indicated by the solid line in FIG. 15 to a large lift and working angle characteristic curve Li3' indicated by the one-dotted line in FIG. 15, ECU 22 outputs the control signal that intake valve open timing IVO of each of intake valves 4, 4 is further phase-advanced, intake valve closure timing IVC is further phase-retarded, and the intake-valve lift is further scaled up. Also, as can be appreciated from a phase retard Se2 from the phase angle at the maximum lift point (often called "central phase angle") of the exhaust-valve lift characteristic curve indicated by the solid line to the phase angle at the maximum lift point of the exhaust-valve lift characteristic curve indicated by the one-dotted line in FIG. 15, exhaust valve open timing EVO and exhaust valve closure timing EVC of each of exhaust valves 5, 5 are both phase-retarded. As discussed above, by the lift and working angle further enlargement control (achieved by VEL1), it is possible to remarkably enhance the charging efficiency of intake air drawn into combustion chamber 03. By the IVO further phase-advance (as a result of the lift and working angle further enlargement control achieved by VEL1) and the EVC phase-retard control (achieved by VTC3), it is possible to increase the valve overlap. Therefore, by virtue of the scavenging effect of combusted gases, the residual gases near the piston TDC position on the exhaust stroke can be effectively pushed or forced into exhaust passage 05 by the boost pressure created by the supercharger, thus further enhancing the intake-air charging efficiency. The reduced residual gases contributes to the enhanced antiknock property, and thus it is possible to enhance the engine torque output by advancing the ignition timing.

As set forth above, in the system of the second embodiment, a valve overlap enlargement can be achieved by EVC phase-retard control, and therefore it is possible to suppress a phase advance of intake valve open timing IVO (achieved by VEL1). Hence, as appreciated from comparison between the phase angle of intake valve closure timing IVC of the large lift and working angle characteristic curve Li3 (indicated by the one-dotted line in FIG. 12) and the phase angle of intake valve closure timing IVC of the large lift and working angle characteristic curve Li3' (indicated by the one-dotted line in FIG. 15), in the case of the system of the second embodiment intake valve closure timing IVC can be phase-retarded towards the piston BDC position, as compared to the system of the first embodiment. Accordingly, in the system of the second embodiment, it is possible to further enhance the intake-air charging efficiency. Therefore, the system of the second embodiment can provide a better acceleration performance (or a better engine torque buildup) when compared to the torque rise curve indicated by the solid line within the "C" area of FIG. 13.

At step S28, the actual angular position of control shaft 17 of the intake-valve VEL mechanism 1, the actual phase of the intake-valve VTC mechanism 2, and the actual phase of the exhaust-valve VTC mechanism 3 are detected based on sensor signals from crank angle sensor 27, drive-shaft angular position sensor 28, the cam angle sensor for the exhaust-valve camshaft, and control-shaft angular position sensor 29 (e.g., a potentiometer).

At step S29, the air/fuel mixture ratio of exhaust gases is detected by means of A/F sensor 012.

At step S30, a check is made to determine whether the detected air/fuel mixture ratio is within a predetermined A/F ratio range defined by permissible upper and lower limits slightly deviated from a stoichiometric air/fuel ratio of 14.7:1. When the answer to step S30 is affirmative (YES), the routine proceeds from step S30 to step S32. Conversely when the answer to step S30 is negative (NO), that is, when ECU 22 determines that the detected air/fuel mixture ratio remarkably deviates from the stoichiometric ratio and shifts to lean (excess air), the routine proceeds from step S30 to step S31.

At step S31, in order to reduce the valve overlap (abbreviated to "O/L"), the lift and working-angle characteristic of intake valve 4 is corrected or shifted to the small lift and working-angle characteristic (i.e., to the IVO phase-retard side), by means of the intake-valve VEL mechanism 1, or a phase of exhaust valve open timing EVO and exhaust valve closure timing EVC of each of exhaust valves 5, 5, in other words, a phase of working angle of exhaust valve 5, corresponding to a phase angle at the maximum exhaust valve lift point, is corrected or shifted to the phase-advance side, by means of the exhaust-valve VTC mechanism 3. In this manner, by reducing the valve overlap O/L, it is possible to effectively suppress fresh air from flowing into the exhaust passage 05, and consequently suppressing exhaust emissions (e.g., NOx) from increasing.

At step S32, boost pressure Pb created by supercharger 07 and detected by boost pressure sensor 09, engine speed Ne, and accelerator opening θ are read.

At step S33, a driver-required engine torque (a target engine torque) is computed or determined based on accelerator opening θ and engine speed Ne, whereas an estimated torque (regarded as an actual engine torque output) is determined based on boost pressure Pb and the current phase angle of drive shaft 6 of the intake-valve VTC system relative to timing sprocket 33 (that is, the actual phase of the intake-valve VTC mechanism 2 or the actual intake-valve timing). A deviation of the computed driver-required engine torque and the estimated torque is used as information on whether engine torque output should be increased or decreased. On the basis of the information (i.e., the deviation between the driver-required engine torque and the estimated torque) on whether engine torque output should be increased or decreased, target IVC of each of intake valves 4, 4 is computed or determined.

At step S34, target IVC is compared to actual IVC, which is determined based on the current phase angle of drive shaft 6 of the intake-valve VTC system relative to timing sprocket 33 (i.e., the actual phase of the intake-valve VTC mechanism 2). When actual IVC is identical to target IVC, the routine returns to step S21. Conversely when actual IVC is different from target IVC, the routine proceeds from step S34 to step S35.

At step S35, in order to correct intake valve closure timing IVC, the intake-valve VEL mechanism 1 is feedback-controlled so that actual IVC is brought closer to target IVC.

More concretely, when the driver-required torque is less than the estimated torque (regarded as the actual engine torque output), intake valve closure timing IVC is corrected in a manner so as to phase-shift (phase-advance) away from the piston BDC position on the intake stroke, thereby reducing the intake-air charging amount and consequently realizing the required torque (low torque requirement) without reducing the valve opening of throttle valve 06. Therefore, it is possible to effectively suppress an increase in pumping loss.

Conversely when the driver-required torque is higher than the estimated torque, intake valve closure timing IVC is corrected in a manner so as to phase-shift (phase-retard) towards the piston BDC position on the intake stroke, thereby increasing the intake-air charging amount and consequently realizing the required torque (high torque requirement). In this manner, engine torque correction can be appropriately achieved by phase-changing intake valve closure timing IVC of each of intake valves 4, 4 arranged closer to combustion chamber 03. Such engine torque correction based on IVC correction is advantageous with respect to a good acceleration response.

As discussed above, the supercharged engine control system of the second embodiment can ensure a good engine torque buildup as well as a good acceleration response. Furthermore, the system of the second embodiment can suppress exhaust emissions (NOx) even after the engine torque buildup has been completed, thus improving fuel economy.

In particular, when accelerating from vehicle stand-still, the system of the second embodiment can provide a more superior acceleration response.

In the second embodiment (see FIGS. 14-15), that is, in the case of the supercharged engine control system related to the control routine shown in FIG. 14, a series of steps S29-S31, related to valve overlap correction, is executed prior to a series of steps S32-S35, related to IVC correction. In lieu thereof, a series of steps S29-S31 (O/L correction) and a series of steps S32-S35 (IVC correction) may be executed simultaneously.

Third Embodiment

Figure 16:
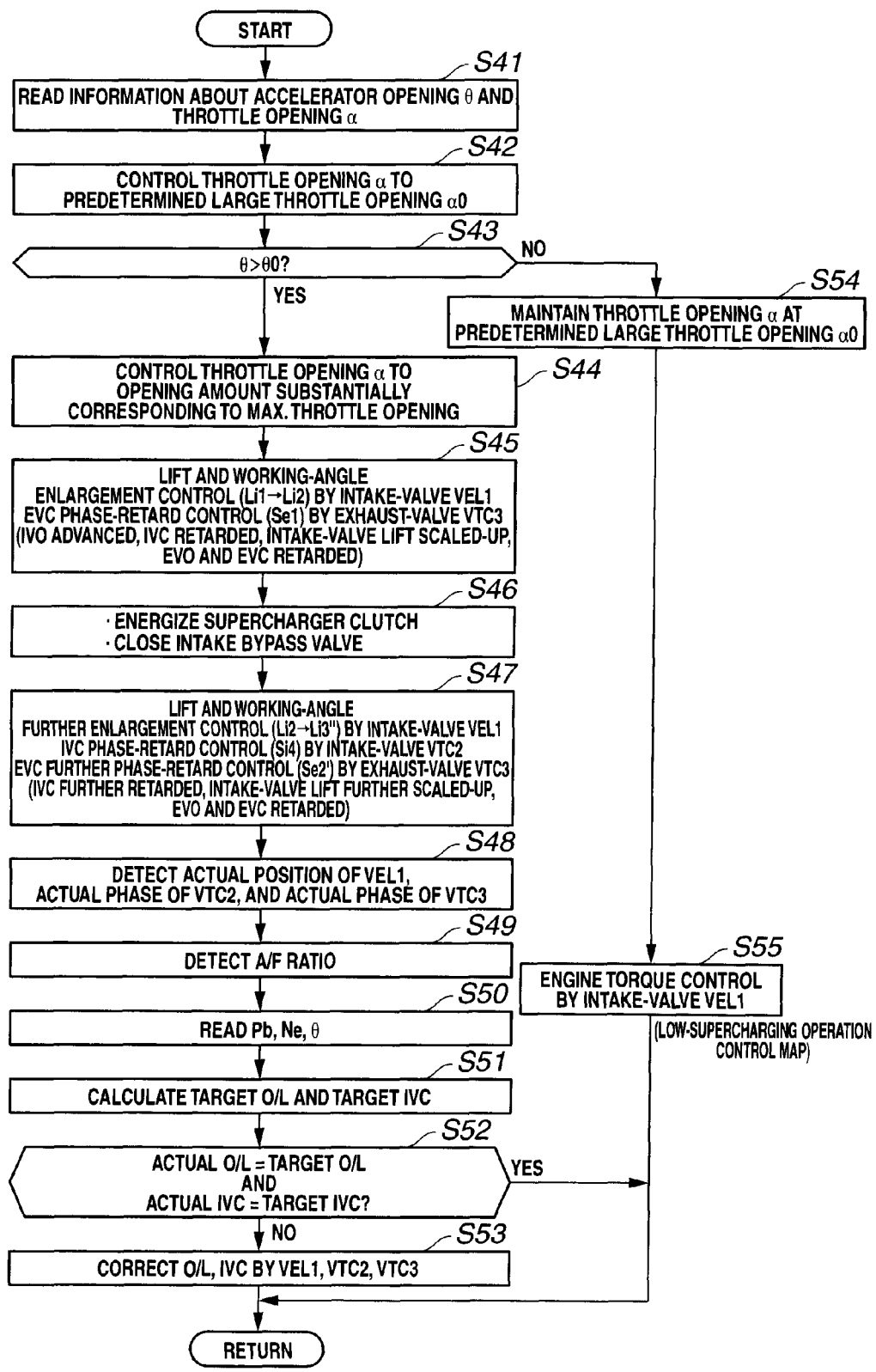
FIG. 16 is a flowchart illustrating a supercharged engine control routine, executed by a controller incorporated in the system of the third embodiment.

Referring now to FIG. 16, there is shown the supercharged engine control routine, executed by the controller incorporated in the system of the third embodiment, after the engine has been started. The system of the third embodiment slightly differs from that of the first embodiment, in that valve-overlap control (valve-overlap enlargement control) is achieved by intake valve open timing IVO control (IVO phase-advance control) via the intake-valve VTC mechanism 2 and exhaust valve closure timing EVC control (EVC phase-retard control) via the exhaust-valve VTC mechanism 3, so as to realize the more enhanced absolute engine power output (a high-performance supercharged engine) in a high engine speed range.

Figure 17:
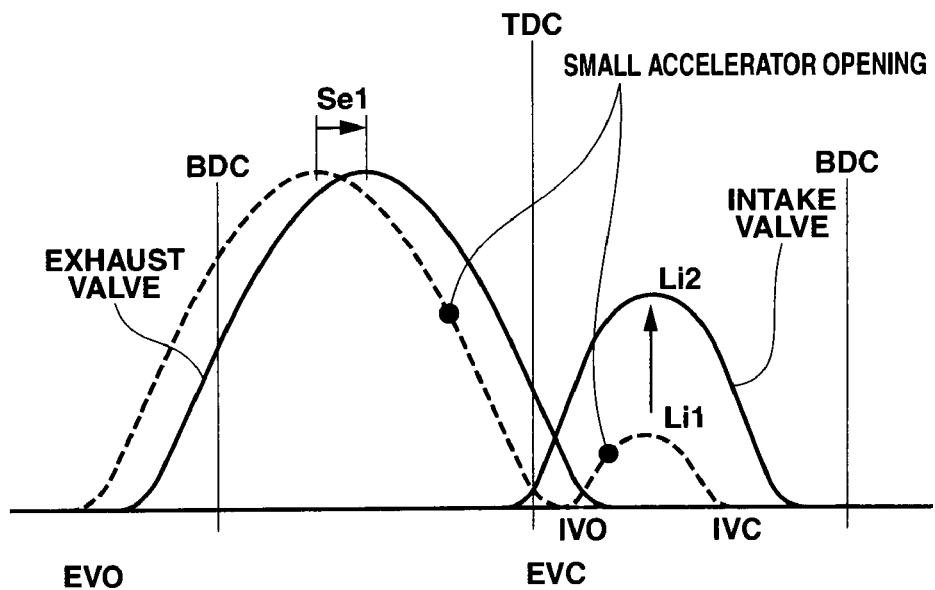
FIG. 17 is a valve lift characteristic diagram illustrating a change in the intake-valve lift characteristic, realized by lift and working-angle enlargement control (Li1→Li2) performed via the intake-valve VEL mechanism, and a change in the exhaust-valve lift characteristic, realized by phase-retard control (Se1) performed via the exhaust-valve VTC mechanism (related to step S45 of the routine of FIG. 16).
Figure 18:
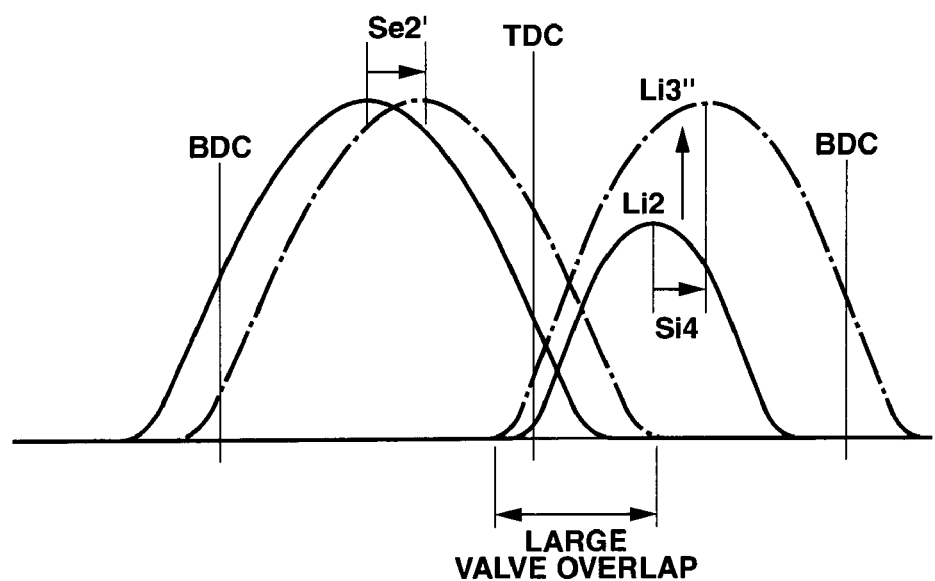
FIG. 18 is a valve lift characteristic diagram illustrating a change in the intake-valve lift characteristic, realized by lift and working-angle further enlargement control (Li2→Li3") performed via the intake-valve VEL mechanism and phase-retard control (Si4) performed via the intake-valve VTC mechanism, and a change in the exhaust-valve lift characteristic, realized by further phase-retard control (Se2') performed via the exhaust-valve VTC mechanism (related to step S47 of the routine of FIG. 16).

The control routine of FIG. 16 (the third embodiment) is somewhat different from the control routine of FIG. 10 (the first embodiment), in that steps S1-S4, S6, S12, and S16-S17 included in the routine shown in FIG. 10 are identical to respective steps S41-S44, S46, S50, and S54-S55 included in the routine shown in FIG. 16, but steps S5, S7-S8, S13-S15 included in the routine shown in FIG. 10 are replaced with steps S45, S47-S48, S51-S53 included in the routine shown in FIG. 16, and that the detected A/F ratio, obtained through step S9, is used for IVO correction in the first embodiment (see the flow from step S9 via step S10 to step S11 in FIG. 10), whereas the detected A/F ratio, obtained through step S49, is used for valve overlap correction (described later) in the third embodiment shown in FIGS. 16-18.

As seen from the flow from step S41 through steps S42-S44 to step S45 in FIG. 16, after throttle opening α has been controlled to an opening amount substantially corresponding to the maximum throttle opening, through step S45 lift and working angle enlargement control for each of intake valves 4, 4 is executed by means of the intake-valve VEL mechanism 1 (see a scaled-up change (Li1→Li2) from the small lift and working angle characteristic curve Li1 indicated by the broken line in FIG. 17 to the middle lift and working angle characteristic curve Li2 indicated by the solid line in FIG. 17). Simultaneously, the phase angle at the maximum lift point of the exhaust-valve lift characteristic curve of each of exhaust valves 5, 5 is retarded by a phase change Se1 by means of the exhaust-valve VTC mechanism 3 (see a phase retard Se1 from the phase angle at the maximum lift point of the exhaust-valve lift characteristic curve indicated by the broken line to the phase angle at the maximum lift point of the exhaust-valve lift characteristic curve indicated by the solid line in FIG. 17). Therefore, prior to energizing the electromagnetic clutch of supercharger 07, the valve overlap can be positively increased by EVC phase-retard control (achieved by VTC3) combined with intake-valve lift and working angle enlargement control (achieved by VEL1).

At step S46, the electromagnetic clutch of supercharger 07 becomes energized (engaged), and simultaneously intake bypass valve 08a becomes closed. By virtue of the exhaust-valve lift and working angle characteristic of each exhaust valve 5 phase-retarded in advance, it is possible to attain a remarkable scavenging effect of exhaust gases from the point of time when the supercharger clutch has been energized. Thus, the system of the third embodiment can achieve a more remarkable engine torque buildup rather than the torque rise curve indicated by the solid line within the "C" area of FIG. 13.

At step S47, ECU 22 outputs a control signal for further phase-retard control for exhaust valve closure timing EVC for each exhaust valves 5, 5 to the exhaust-valve VTC mechanism 3 (see a further phase retard Se2' from the phase angle at the maximum lift point of the exhaust-valve lift characteristic curve indicated by the solid line to the phase angle at the maximum lift point of the exhaust-valve lift characteristic curve indicated by the one-dotted line in FIG. 18). Simultaneously, ECU 22 outputs a control signal for lift and working-angle further enlargement control for each of intake valves 4, 4 to the intake-valve VEL mechanism 1 (see a further scaled-up change (Li2→Li3") from the middle lift and working angle characteristic curve Li2 indicated by the solid line in FIG. 18 to a large lift and working angle characteristic curve Li3" indicated by the one-dotted line in FIG. 18). Simultaneously, ECU 22 outputs a control signal for phase-retard control for intake valve closure timing IVC for each intake valves 4, 4 to the intake-valve VTC mechanism 2 (see a phase retard Si4 from the phase angle at the maximum lift point of the intake-valve lift characteristic curve Li2 indicated by the solid line to the phase angle at the maximum lift point of the intake-valve lift characteristic curve Li3" indicated by the one-dotted line in FIG. 18). That is, ECU 22 simultaneously outputs control signals to the respective mechanisms VEL1, VTC2, and VTC3, such that exhaust valve closure timing EVC for each exhaust valves 5, 5 is further phase-retarded, the intake-valve lift is further scaled up, and intake valve closure timing IVC for each intake valves 4, 4 is phase-retarded.

When taking account of only the valve overlap change, created by the intake-valve VTC mechanism 2 and the exhaust-valve VTC mechanism 3, owing to the relationship between the further phase retard Se2' (achieved by VTC3) and the phase retard Si4 (achieved by VTC2), defined by the inequality Se2'>Si4, the valve overlap change occurs in a direction enlarging or increasing of valve overlap O/L.

In addition to the above, by virtue of lift and working angle enlargement control achieved by VEL1, the system of the third embodiment can realize a greater valve overlap increase, as compared to the first and second embodiments. Thus, the system of the third embodiment can provide a more superior scavenging effect of exhaust gases in a high engine speed range.

For the same valve overlap O/L (defined in terms of crankangle) during intake and exhaust valves are at least partly open, assume that this valve overlap O/L is converted into a time length (that is, a valve overlapping time period). As a matter of course, the valve overlapping time period, which is converted from valve overlap O/L defined in terms of crankangle into the time length, tends to decrease, as engine speed Ne increases. Hence, the scavenging action tends to become insufficient owing to the shortened valve overlapping time period in a high engine speed range. As discussed previously, the system of the third embodiment can realize a greater valve overlap increase even in a high speed range, and therefore it is possible to more greatly enhance the scavenging efficiency even in a high speed range. Additionally, as can be appreciated from comparison between (i) the large lift and working angle characteristic curve Li3" indicated by the one-dotted line in FIG. 18 (the third embodiment) and (ii) each of the large lift and working angle characteristic curve Li3 indicated by the one-dotted line in FIG. 12 (the first embodiment) and the large lift and working angle characteristic curve Li3' indicated by the one-dotted line in FIG. 15 (the second embodiment), in the system of the third embodiment the lift and working angle for each of intake valves 4, 4 can be more greatly scaled up as compared to the first and second embodiments, thereby lengthening the lifted time period. Furthermore, by the further IVC phase-retard (in particular, as a result of IVC phase-retard control achieved by VTC2), it is possible to effectively phase-retard intake valve closure timing IVC to a phase angle after the piston BDC position on the intake stroke. Setting intake valve closure timing IVC to the phase angle somewhat retarded from BDC on the intake stroke suppresses blow-back gas flow from combustion chamber 03 back to intake passage 04, thereby remarkably enhancing the intake-air charging efficiency in the high speed range. As a result of sufficiently charged intake air into combustion chamber 03, it is possible to sufficiently enhance engine torque output.

At step S48, the actual angular position of control shaft 17 of the intake-valve VEL mechanism 1, the actual phase of the intake-valve VTC mechanism 2, and the actual phase of the exhaust-valve VTC mechanism 3 are detected based on sensor signals from crank angle sensor 27, drive-shaft angular position sensor 28, the cam angle sensor for the exhaust-valve camshaft, and control-shaft angular position sensor 29 (e.g., a potentiometer).

At step S49, the air/fuel mixture ratio of exhaust gases is detected by means of A/F sensor 012. ECU 22 determines, based on the detected A/F ratio, whether the detected A/F ratio is lean (excess air) or rich (less air) in comparison with a stoichiometric A/F ratio (14.7:1). When the detection result of A/F sensor 012 exhibits a lean A/F ratio, ECU 22 determines that the scavenging action is excessive and thus valve overlap (O/L) decrease should be executed. That is, the detected A/F ratio is utilized as information on whether O/L correction should be initiated (in other words, information on whether valve overlap O/L should be increased or decreased).

At step S50, boost pressure Pb, engine speed Ne, and accelerator opening θ are read.

At step S51, a driver-required engine torque (a target engine torque) is computed or determined based on accelerator opening θ and engine speed Ne, whereas an estimated torque (regarded as an actual engine torque output) is determined based on boost pressure Pb and the current phase angle of drive shaft 6 of the intake-valve VTC system relative to timing sprocket 33 (that is, the actual phase of the intake-valve VTC mechanism 2 or the actual intake-valve timing). A deviation of the computed driver-required engine torque and the estimated torque is used as information on whether engine torque output should be increased or decreased. On the basis of the information (i.e., the deviation between the driver-required engine torque and the estimated torque) on whether engine torque output should be increased or decreased, target IVC of each of intake valves 4, 4 is computed or determined. At the same time, a target valve overlap (simply, target O/L) of intake valve 4 and exhaust valve 5 is computed or determined based on the detected A/F ratio.

At step S52, an actual valve overlap (simply, actual O/L) is computed or determined based on the current angular phase of drive shaft 6 of the intake-valve VTC system relative to timing sprocket 33 (i.e., the actual phase of the intake-valve VTC mechanism 2) and the current angular phase of the exhaust-valve camshaft relative to timing sprocket 60 (i.e., the actual phase of the exhaust-valve VTC mechanism 3), whereas actual IVC is determined based on the current phase angle of drive shaft 6 of the intake-valve VTC system relative to timing sprocket 33 (i.e., the actual phase of the intake-valve VTC mechanism 2). Thereafter, target O/L is compared to actual O/L and simultaneously target IVC is compared to actual IVC. When target O/L is identical to actual O/L and target IVC is identical to actual IVC, the routine returns to step S41. Conversely when target O/L is different from actual O/L and/or target IVC is different from actual IVC, the routine proceeds from step S52 to step S53.

At step S53, in order to correct valve overlap O/L and/or intake valve closure timing IVC, the intake-valve VEL mechanism 1, the exhaust-valve VTC mechanism 3, and/or the intake-valve VTC mechanism 2 are feedback-controlled so that actual O/L is brought closer to target O/L and actual IVC is brought closer to target IVC.

Fourth Embodiment

Figure 19:
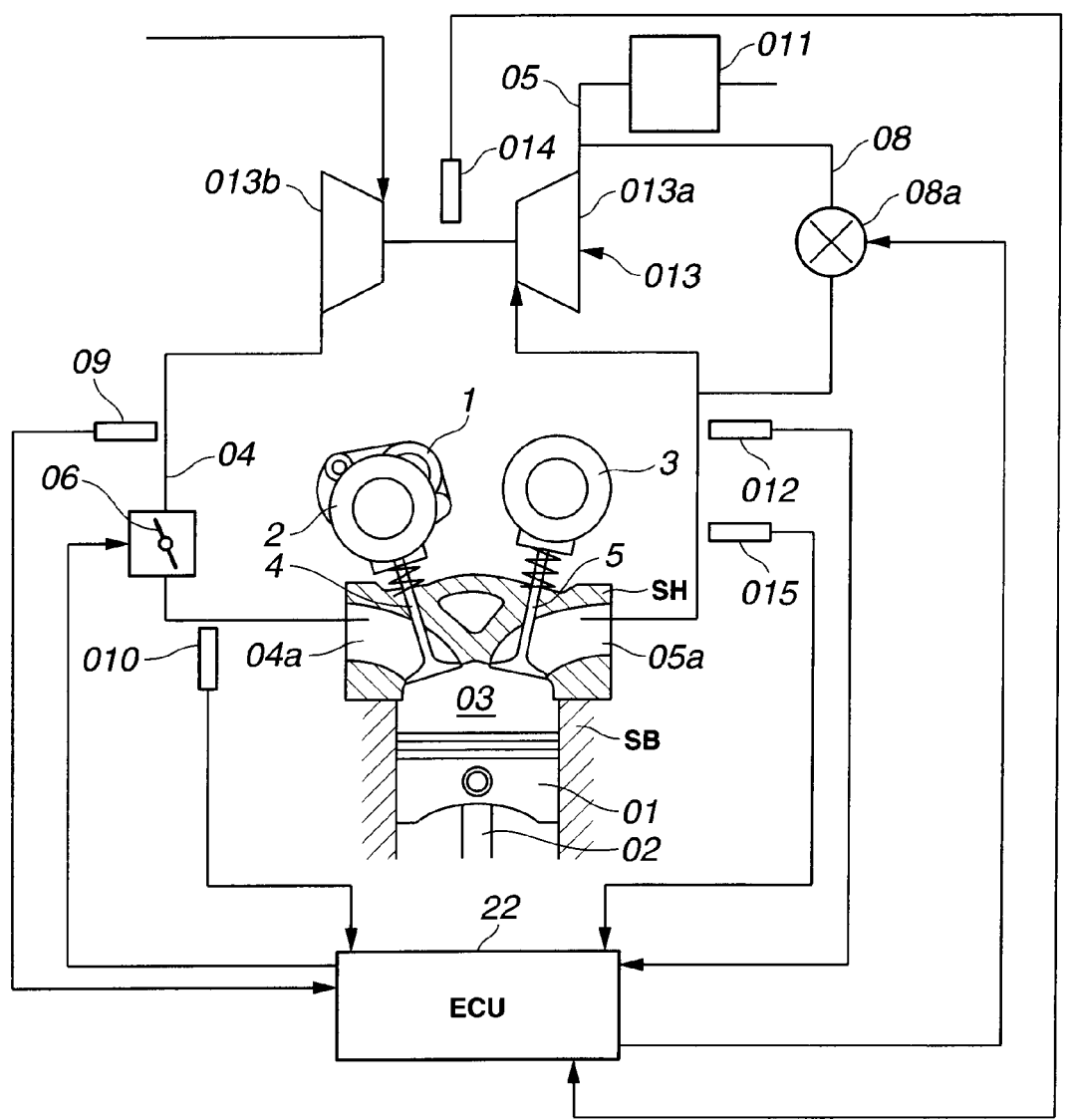
FIG. 19 is a schematic diagram illustrating a turbo-charged internal combustion engine to which a variable valve actuation system and an engine control apparatus of the fourth embodiment is applied.

Referring now to FIG. 19, there is shown the engine control system for a turbo-charged internal combustion engine with a turbocharger 013 as a mechanical supercharging device instead of using supercharger 07. Exhaust gases are utilized to drive or rotate an exhaust turbine 013a of turbocharger 013. That is, the engine control apparatus of the fourth embodiment is somewhat different from that of the first embodiment, in that the variable valve actuation system of the fourth embodiment is applied to such a turbocharger-equipped internal combustion engine rather than a supercharger-equipped internal combustion engine. The other construction of the system of the fourth embodiment is similar to that of the first embodiment.

Figure 20:
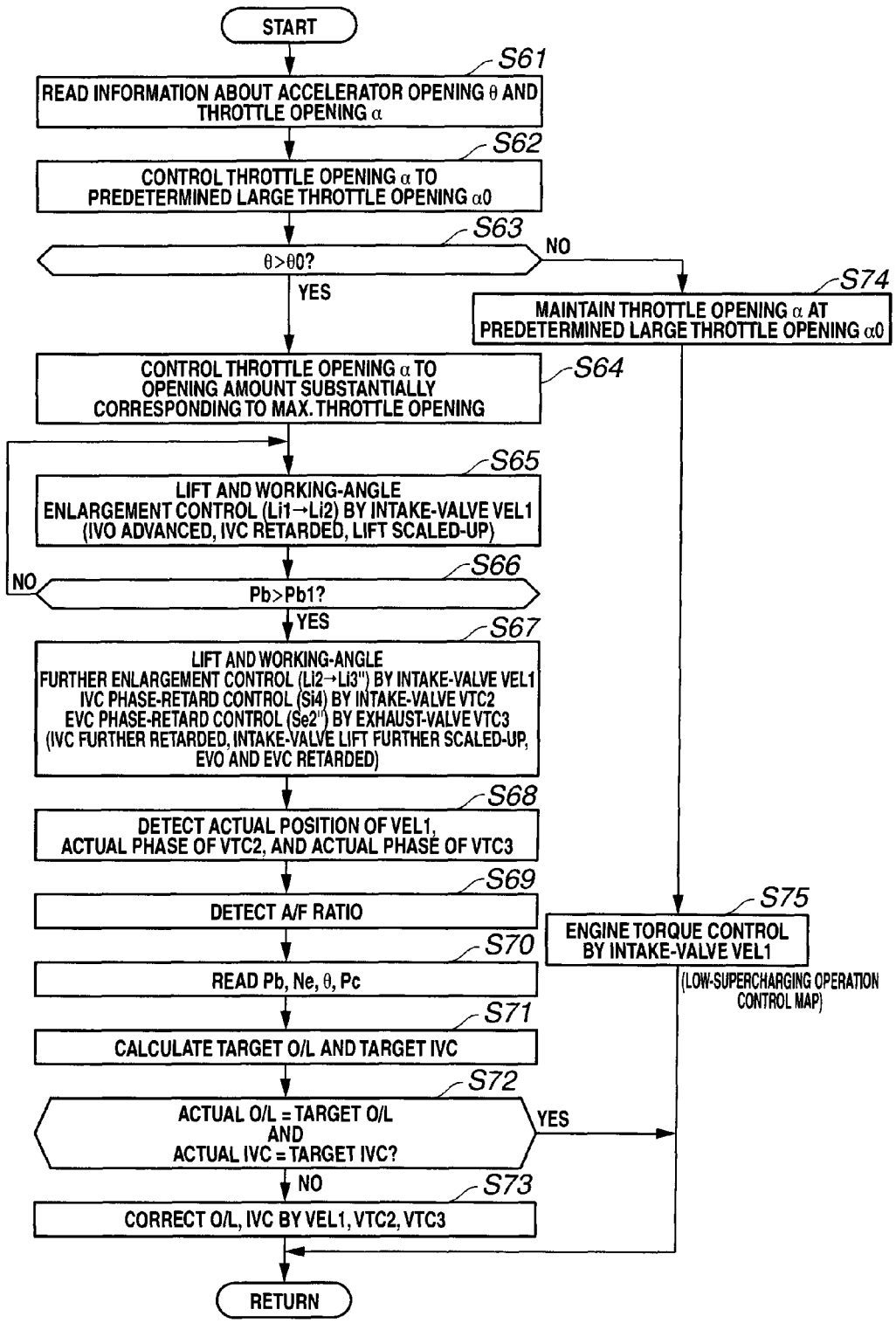
FIG. 20 is a flowchart illustrating a turbo-charged engine control routine, executed by a controller incorporated in the system of the fourth embodiment.

Referring now to FIG. 20, there is shown the turbo-charged engine control routine, executed by the controller (ECU 22) incorporated in the system of the fourth embodiment, after the engine has been started. Briefly speaking, the system of the fourth embodiment slightly differs from that of the third embodiment, in that an exhaust pressure Pc, estimated by an exhaust-turbine speed sensor 014, is used as an additional control parameter, the execution time length of lift and working-angle enlargement control (Li1→Li2), performed via the intake-valve VEL mechanism 1, varies depending on whether boost pressure Pb (see the return flow from step S66 back to step S65), detected by boost pressure sensor 09, reaches a predetermined boost pressure value Pb1, and execution of valve-overlap enlargement control (see step S67), which is achieved by the exhaust-valve VTC mechanism 3, is inhibited unless boost pressure Pb reaches predetermined boost pressure value Pb1 (see the flow from step S66 to step S67). In the turbo-charged engine control system of the fourth embodiment shown in FIG. 19, exhaust pressure Pc is estimated by exhaust-turbine speed sensor 014. In lieu thereof, exhaust pressure Pc may be measured directly by means of an exhaust pressure sensor 015.

Also, the control routine of FIG. 20 (the fourth embodiment) is somewhat different from the control routine of FIG. 16 (the third embodiment), in that steps S41-S44, S48-S49, and S51-S55 included in the routine shown in FIG. 16 are identical to respective steps S61-S64, S68-S69, and S71-S75 included in the routine shown in FIG. 20, but steps S45-S47, and S50 included in the routine shown in FIG. 16 are replaced with steps S65-S67, and S70 included in the routine shown in FIG. 20.

Figure 21:
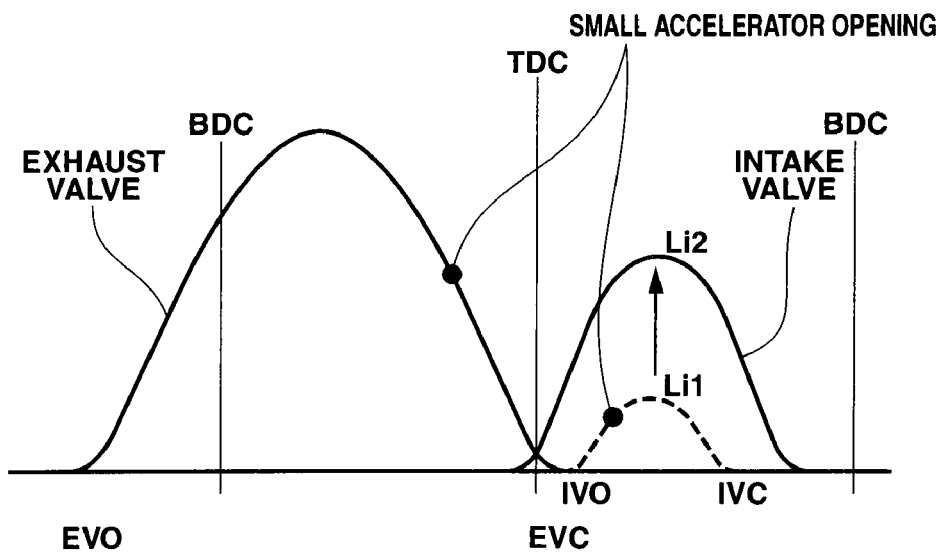
FIG. 21 is a valve lift characteristic diagram illustrating a change in the intake-valve lift characteristic, realized by lift and working-angle enlargement control (Li1→Li2) performed via the intake-valve VEL mechanism (related to step S65 of the routine of FIG. 20).

As seen from the flow from step S61 through steps S62-S64 to step S65 in FIG. 20, after throttle opening α has been controlled to an opening amount substantially corresponding to the maximum throttle opening, through step S65 lift and working angle enlargement control for each of intake valves 4, 4 is executed by means of the intake-valve VEL mechanism 1 (see a scaled-up change from the small lift and working angle characteristic curve Li1 indicated by the broken line in FIG. 21 to the middle lift and working angle characteristic curve Li2 indicated by the solid line in FIG. 21). As a result, intake valve open timing IVO is phase-advanced, intake valve closure timing IVC is phase-retarded, and the intake-valve lift is scaled up.

By the way, regarding the pressure in intake passage 04, this internal pressure has already reached a pressure level substantially corresponding to atmospheric pressure from the point of time when accelerator opening θ is small (i.e., when θ≦θ0), because of the proper setting of throttle opening α to predetermined large throttle opening α0, as previously discussed. Under these conditions, assume that the working angle of each intake valve 4 is enlarged by the previously-noted lift and working angle enlargement control. In such a case, it is possible to effectively introduce fresh air into combustion chamber 03 without any delay in intake-air flow through intake passage 04, thus ensuring a rapid engine torque rise. In the case of the turbo-charged engine, the smooth engine torque rise, arising from fresh air effectively introduced into combustion chamber 03 without any airflow delay, increases the amount of exhaust gases, thereby effectively rising the rotational speed of exhaust turbine 013*a*, whose shaft is common to an intake-air compressor 013*b*. Owing to the risen exhaust-turbine speed, boost pressure Pb also rises. Subsequently to step S65, step S66 occurs.

At step S66, a check is made to determine whether boost pressure Pb, detected by boost pressure sensor 09, reaches the predetermined boost pressure value Pb1. When the answer to step S66 is affirmative (YES), that is, when Pb>Pb1, the routine proceeds from step S66 to step S67. Conversely when the answer to step S66 is negative (NO), that is, when Pb≦Pb1, the routine returns to step S65, so as to repeatedly execute the lift and working angle enlargement control.

Figure 22:
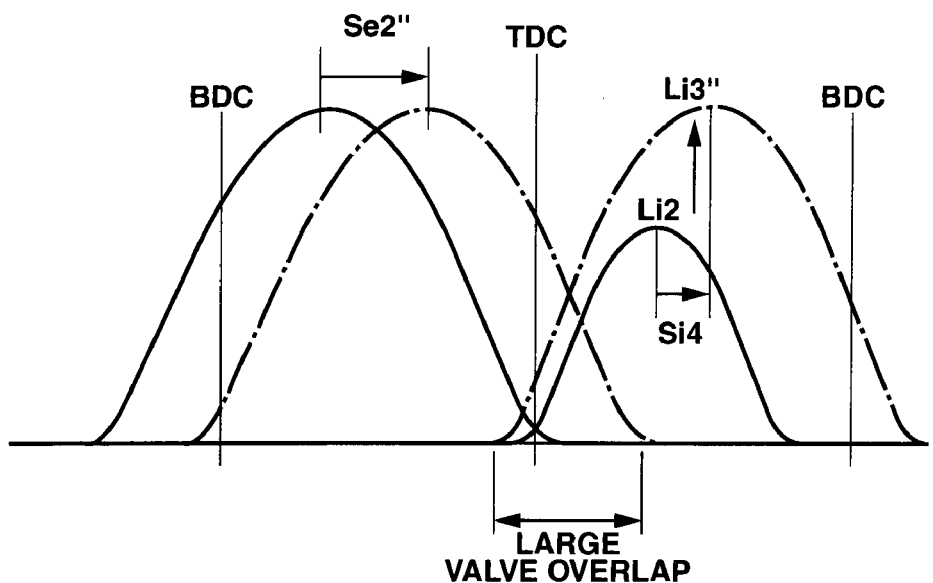
FIG. 22 is a valve lift characteristic diagram illustrating a change in the intake-valve lift characteristic, realized by lift and working-angle further enlargement control (Li2→Li3") performed via the intake-valve VEL mechanism and phase-retard control (Si4) performed via the intake-valve VTC mechanism, and a change in the exhaust-valve lift characteristic, realized by phase-retard control (Se2") performed via the exhaust-valve VTC mechanism (related to step S67 of the routine of FIG. 20).

At step S67, ECU 22 outputs a control signal for phase-retard control for exhaust valve closure timing EVC for each exhaust valves 5, 5 to the exhaust-valve VTC mechanism 3 (see a phase retard Se2″ from the phase angle at the maximum lift point of the exhaust-valve lift characteristic curve indicated by the solid line to the phase angle at the maximum lift point of the exhaust-valve lift characteristic curve indicated by the one-dotted line in FIG. 22). Simultaneously, ECU 22 outputs a control signal for lift and working-angle further enlargement control for each of intake valves 4, 4 to the intake-valve VEL mechanism 1 (see a further scaled-up change (Li2→Li3″) from the middle lift and working angle characteristic curve Li2 indicated by the solid line in FIG. 22 to the large lift and working angle characteristic curve Li3″ indicated by the one-dotted line in FIG. 22). Simultaneously, ECU 22 outputs a control signal for phase-retard control for intake valve closure timing IVC for each intake valves 4, 4 to the intake-valve VTC mechanism 2 (see a phase retard Si4 from the phase angle at the maximum lift point of the intake-valve lift characteristic curve Li2 indicated by the solid line to the phase angle at the maximum lift point of the intake-valve lift characteristic curve Li3″ indicated by the one-dotted line in FIG. 22). That is, ECU 22 simultaneously outputs control signals to the respective mechanisms VEL1, VTC2, and VTC3, such that exhaust valve closure timing EVC for each exhaust valves 5, 5 is phase-retarded, the intake-valve lift is further scaled up, and intake valve closure timing IVC for each exhaust valves 4, 4 is phase-retarded. As a result, a remarkable valve overlap change occurs in a direction enlarging or increasing of valve overlap O/L.

The reason why valve-overlap enlargement control (see step S67), which is achieved by the exhaust-valve VTC mechanism 3, is inhibited unless boost pressure Pb reaches predetermined boost pressure value Pb1 is that, under low boost pressure, back-flow of exhaust gases into combustion chamber 03 occurs due to exhaust pressure Pc during a valve overlapping period and therefore there is an increased tendency for the engine torque to be undesirably suppressed. For the reasons discussed above, the valve-overlap enlargement control is initiated from the point of time when predetermined boost pressure value Pb1 has been reached, thus avoiding the engine torque output from being undesirably suppressed due to exhaust pressure Pc under low boost pressure Consequently, it is possible to ensure a smooth torque buildup by virtue of the scavenging effect of combusted gases. That is to say, when taking account of only the valve overlap change, created by the intake-valve VTC mechanism 2 and the exhaust-valve VTC mechanism 3, owing to the relationship between the remarkably great phase retard Se2″ (achieved by VTC3) and the small phase retard Si4 (achieved by VTC2), defined by the inequality Se2″>Si4, the valve overlap change occurs in a direction enlarging or increasing of valve overlap O/L. In addition, by virtue of lift and working angle enlargement control achieved by VEL1, the system of the fourth embodiment can realize a greater valve overlap increase. Thus, in a similar manner to the third embodiment, the system of the fourth embodiment can also provide a more superior scavenging effect of exhaust gases. By virtue of the superior scavenging effect of combusted gases, the residual gases near the piston TDC position on the exhaust stroke can be effectively pushed or forced into exhaust passage 05 by the boost pressure created by the turbocharger, thus further enhancing the intake-air charging efficiency. The reduced residual gases contribute to the enhanced antiknock property, and thus it is possible to enhance the engine torque output by advancing the ignition timing.

At step S68, the actual angular position of control shaft 17 of the intake-valve VEL mechanism 1, the actual phase of the intake-valve VTC mechanism 2, and the actual phase of the exhaust-valve VTC mechanism 3 are detected based on sensor signals from crank angle sensor 27, drive-shaft angular position sensor 28, the cam angle sensor for the exhaust-valve camshaft, and control-shaft angular position sensor 29 (e.g., a potentiometer).

At step S69, the air/fuel mixture ratio of exhaust gases is detected by means of A/F sensor 012. ECU 22 determines, based on the detected A/F ratio, whether the detected A/F ratio is lean (excess air) or rich (less air) in comparison with a stoichiometric A/F ratio (14.7:1). When the detection result of A/F sensor 012 exhibits a lean A/F ratio, ECU 22 determines that the scavenging action is excessive and thus valve overlap (O/L) decrease should be executed. That is, the detected A/F ratio is utilized as information on whether O/L correction should be initiated (in other words, information on whether valve overlap O/L should be increased or decreased).

At step S70, boost pressure Pb, detected by boost pressure sensor 09, engine speed Ne, and accelerator opening θ, and exhaust pressure Pc, estimated by exhaust-turbine speed sensor 014 (or exhaust pressure Pc detected directly by exhaust pressure sensor 015), are read.

At step S71, a driver-required engine torque (a target engine torque) is computed or determined based on accelerator opening θ and engine speed Ne, whereas an estimated torque (regarded as an actual engine torque output) is determined based on boost pressure Pb, exhaust pressure Pc, and the current phase angle of drive shaft 6 of the intake-valve VTC system relative to timing sprocket 33 (that is, the actual phase of the intake-valve VTC mechanism 2 or the actual intake-valve timing). A deviation of the computed driver-required engine torque and the estimated torque is used as information on whether engine torque output should be increased or decreased. On the basis of the information (i.e., the deviation between the driver-required engine torque and the estimated torque) on whether engine torque output should be increased or decreased, target IVC of each of intake valves 4, 4 is computed or determined. At the same time, a target valve overlap (simply, target O/L) of intake valve 4 and exhaust valve 5 is computed or determined based on the detected A/F ratio.

At step S72, an actual valve overlap (simply, actual O/L) is computed or determined based on the current angular phase of drive shaft 6 of the intake-valve VTC system relative to timing sprocket 33 (i.e., the actual phase of the intake-valve VTC mechanism 2) and the current angular phase of the exhaust-valve camshaft relative to timing sprocket 60 (i.e., the actual phase of the exhaust-valve VTC mechanism 3), whereas actual IVC is determined based on the current phase angle of drive shaft 6 of the intake-valve VTC system relative to timing sprocket 33 (i.e., the actual phase of the intake-valve VTC mechanism 2). Thereafter, target O/L is compared to actual O/L and simultaneously target IVC is compared to actual IVC. When target O/L is identical to actual O/L and target IVC is identical to actual IVC, the routine returns to step S61. Conversely when target O/L is different from actual O/L and/or target IVC is different from actual IVC, the routine proceeds from step S72 to step S73.

At step S73, in order to correct valve overlap O/L and/or intake valve closure timing IVC, the intake-valve VEL mechanism 1, the exhaust-valve VTC mechanism 3, and/or the intake-valve VTC mechanism 2 are feedback-controlled so that actual O/L is brought closer to target O/L and actual IVC is brought closer to target IVC.

Therefore, by virtue of the appropriately controlled scavenging effect, it is possible to ensure a suitable catalyst conversion performance of three way catalytic converter 011, thus ensuring good exhaust emission control performance. Additionally, residual gases in combustion chamber 03 can be effectively reduced and thus the antiknock property can be enhanced, and hence the ignition timing can be advanced. As a result of this, it is possible to effectively avoid undesired overheating of three way catalytic converter 011 as well as an increase in the fuel consumption rate. Furthermore, engine torque adjustment is achieved by phase-changing intake valve closure timing IVC of each of intake valves 4, 4 and therefore it is possible to suppress a pumping loss, thus improving fuel economy.

Fifth Embodiment

Figure 23:
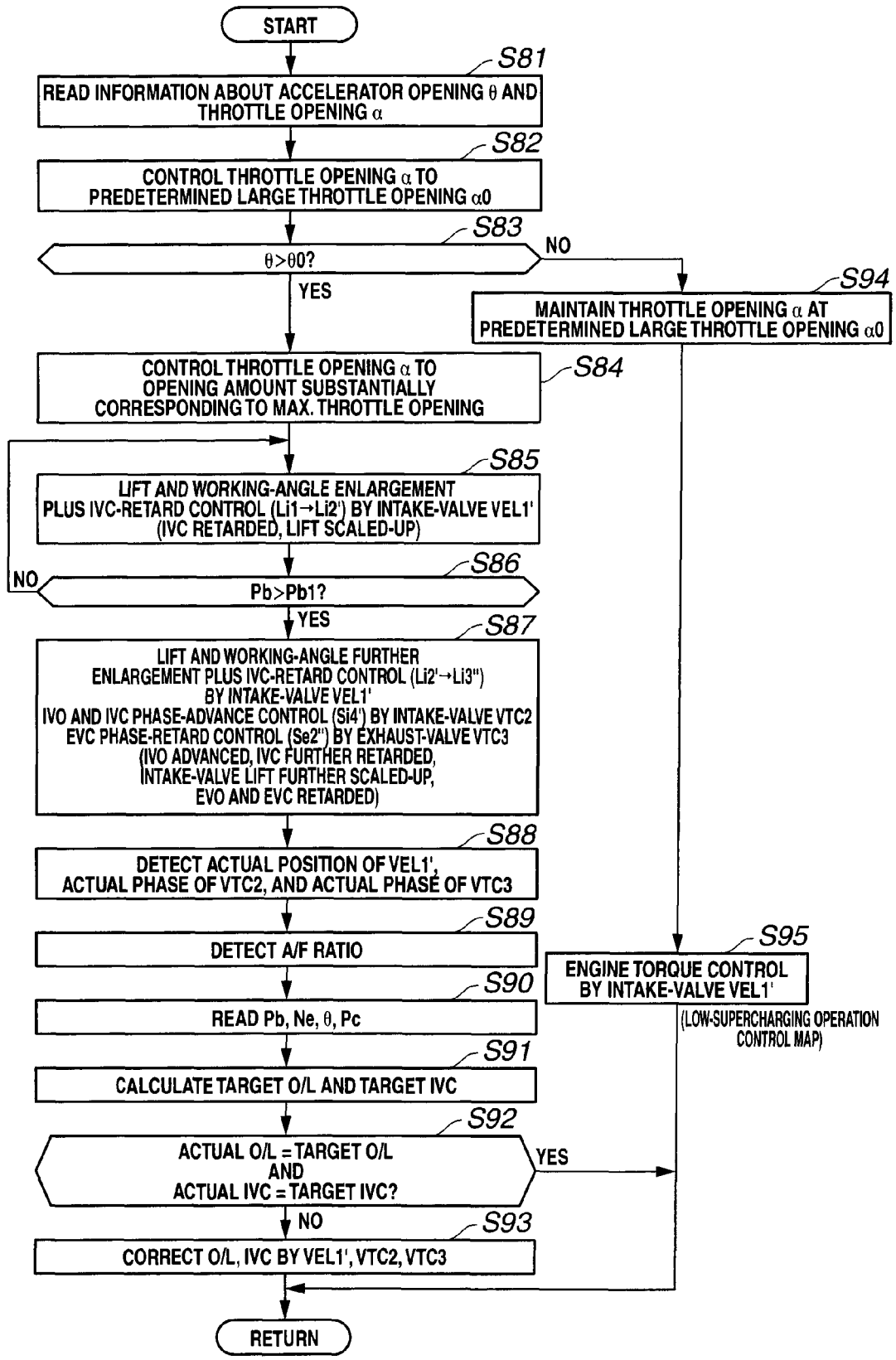
FIG. 23 is a flowchart illustrating a turbo-charged engine control routine, executed by a controller incorporated in the system of the fifth embodiment.
Figure 24:
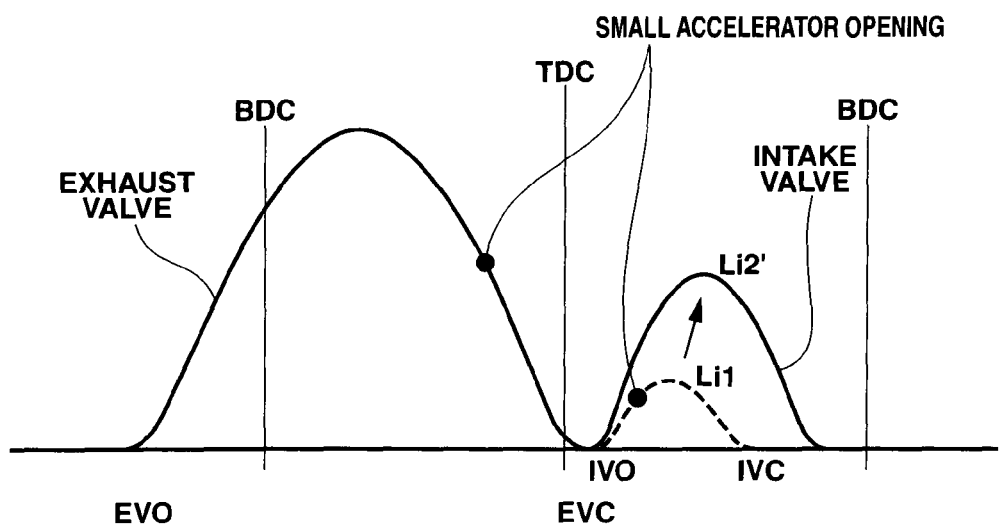
FIG. 24 is a valve lift characteristic diagram illustrating a change in the intake-valve lift characteristic, realized by lift and working-angle enlargement plus IVC-retard control (Li1→Li2') performed via another type of intake-valve VEL mechanism (VEL1') constructed by a multinodular-link motion converter as disclosed in U.S. Pat. No. 6,041,746 corresponding to Japanese Patent Provisional Publication No. 11-264307 (related to step S85 of the routine of FIG. 23).
Figure 25:
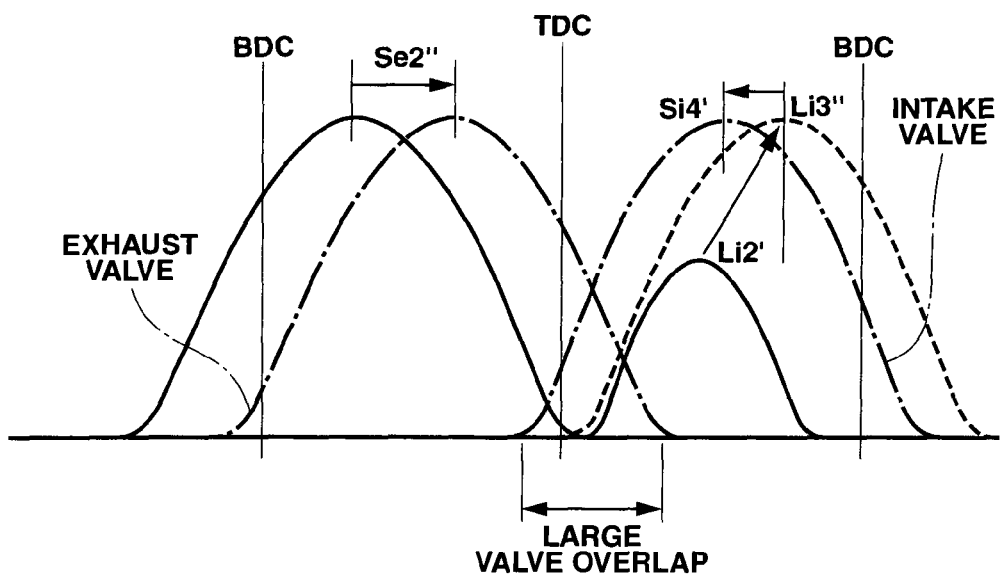
FIG. 25 is a valve lift characteristic diagram illustrating a change in the intake-valve lift characteristic, realized by lift and working-angle further enlargement plus IVC-retard control (Li2'→Li3") performed via the intake-valve VEL mechanism (VEL1') constructed by the multinodular-link motion converter as disclosed in U.S. Pat. No. 6,041,746 and phase-advance control (Si4') performed via the intake-valve VTC mechanism, and a change in the exhaust-valve lift characteristic, realized by phase-retard control (Se2") performed via the exhaust-valve VTC mechanism (related to step S87 of the routine of FIG. 23).

FIGS. 23-25 refer to the turbo-charged engine control system of the fifth embodiment with a multinodular-link motion converter having a so-called unsymmetrical IVO-IVC phase-change characteristic (described later). That is, the multinodular-link motion converter of the intake-valve VEL mechanism (VEL1') used in the system of the fifth embodiment differs from that of the intake-valve VEL mechanism 1 (VEL1) used in the system of the fourth embodiment, in construction.

More concretely, the multinodular-link motion converter of the intake-valve VEL mechanism 1 (VEL1) used in each of the systems of the first to fourth embodiments has a symmetrical IVO-IVC phase-change characteristic that, when scaling up the lift characteristic, a phase-advancing degree of intake valve open timing IVO and a phase-retarding degree of intake valve closure timing IVC are substantially symmetrical with each other and there is a less phase shift (or a less phase change) from the phase angle at the maximum lift point of a relatively small lift characteristic curve before scaling up to the phase angle at the maximum lift point of a relatively large lift characteristic curve after scaling up. In contrast, the multinodular-link motion converter of the intake-valve VEL mechanism (VEL1') used in the system of the fifth embodiment has an unsymmetrical IVO-IVC phase-change characteristic that, when scaling up the lift characteristic, a phase-advancing degree of intake valve open timing IVO and a phase-retarding degree of intake valve closure timing IVC are unsymmetrical with each other and there is a phase shift (or a phase advance or a phase retard) from the phase angle at the maximum lift point of a relatively small lift characteristic curve before scaling up to the phase angle at the maximum lift point of a relatively large lift characteristic curve after scaling up. As can be seen from a scaled-up intake-valve lift change (Li1→Li2') shown in FIG. 24 or a scaled-up intake-valve lift change (Li2'→Li3") shown in FIG. 25, the system of the fifth embodiment has an unsymmetrical IVO-IVC phase-change characteristic that, when scaling up the lift characteristic, a phase-advancing degree of intake valve open timing IVO is less whereas a phase-retarding degree of intake valve closure timing IVC is great, and a phase retard from the phase angle at the maximum lift point of a relatively small lift characteristic curve before scaling up to the phase angle at the maximum lift point of a relatively large lift characteristic curve after scaling up takes place. One such unsymmetrical IVO-IVC phase-change characteristic, multinodular-link motion converter equipped VEL mechanism has been disclosed in U.S. Pat. No. 6,041,746 corresponding to Japanese Patent Provisional Publication No. 11-264307, the teachings of which are hereby incorporated by reference.

Referring now to FIG. 23, there is shown the turbo-charged engine control routine, executed by the controller incorporated in the system of the fifth embodiment, after the engine has been started. The control routine of FIG. 23 (the fifth embodiment) is somewhat different from the control routine of FIG. 20 (the fourth embodiment), in that steps S61-S64, S66, S68-S75 included in the routine shown in FIG. 20 are identical to respective steps S81-S84, S86, S88-S95 included in the routine shown in FIG. 23, but steps S65 and S67 included in the routine shown in FIG. 23 are replaced with steps S85 and S87 included in the routine shown in FIG. 23.

At step S85, lift and working-angle enlargement plus IVC-retard control (Li1→Li2') for each of intake valves 4, 4 is executed by means of the intake-valve VEL mechanism (VEL1') (see an unsymmetrical scaled-up change from the small lift and working angle characteristic curve Li1 indicated by the broken line in FIG. 24 to the middle lift and working angle characteristic curve Li2' indicated by the solid line in FIG. 24). When scaling up, a phase retard from the phase angle at the maximum lift point of the relatively small lift characteristic curve (Li1) before scaling up to the phase angle at the maximum lift point of the relatively large lift characteristic curve (Li2') after scaling up occurs simultaneously owing to the unsymmetrical scaled-up valve-lift characteristic inherent to the multinodular-link motion converter of the intake-valve VEL mechanism (VEL1') used in the system of the fifth embodiment, and as a result, there is a less phase advance of intake valve open timing IVO, whereas there is a remarkable phase retard of intake valve closure timing IVC.

For the reasons discussed above, a change (a phase retard) in intake valve closure timing IVC becomes quick. Additionally, for the same phase angle (before BDC) to which intake valve closure timing IVC has to be controlled, the system (the multinodular-link motion converter of VEL1') of the fifth embodiment can realize by a less valve lift increase as compared to a valve lift increase, obtained by the system (the multinodular-link motion converter of VEL1) of the fourth embodiment. Accordingly, it is possible to enhance a time rate of increase in the intake-air charging speed. On the other hand, there is a less phase advance of intake valve open timing IVO, in other words, a change (a phase advance) in intake valve open timing IVO becomes slow, but, at this time, boost pressure Pb does not yet develop sufficiently, and thus such a slow IVO change is negligible. Hence, the system of the fifth embodiment enables the superior acceleration response.

Thereafter, as soon as ECU 22 determines (through step S86) that predetermined boost pressure value Pb1 has been reached, the routine proceeds from step S86 to step S87.

At step S87, lift and working-angle further enlargement plus IVC-retard control (Li2'→Li3") for each of intake valves 4, 4 is executed by means of the intake-valve VEL mechanism (VEL1') (see an unsymmetrical scaled-up change from the middle lift and working angle characteristic curve Li2' indicated by the solid line in FIG. 25 to the large lift and working angle characteristic curve Li3" indicated by the broken line in FIG. 25). Almost at the same time, in order to appropriately compensate for an excessive phase retard of intake valve closure timing IVC to a phase angle after BDC by means of VEL1', intake valve closure timing IVC is slightly phase-advanced by means of the intake-valve VTC mechanism 2 (VTC2) (see a phase advance Si4' from the phase angle at the maximum lift point of the intake-valve lift characteristic curve Li3" indicated by the broken line to the phase angle at the maximum lift point of the intake-valve lift characteristic curve indicated by the one-dotted line in FIG. 25). By IVC phase-advance control (Si4') combined with lift and working-angle further enlargement plus IVC-retard control (Li2'→Li3"), it is possible to properly control intake valve closure timing IVC to almost the same phase angle (near but after BDC on the intake stroke) as the intake valve closure timing IVC of the large lift and working angle characteristic curve Li3" (obtained by the system of the fourth embodiment) indicated by the one-dotted line in FIG. 22. Almost at the same time, for the purpose of valve-overlap (O/L) enlargement control, phase-retard control for exhaust valve closure timing EVC for each exhaust valves 5, 5 is executed by means of the exhaust-valve VTC mechanism 3 (see a phase retard Se2" from the phase angle at the maximum lift point of the exhaust-valve lift characteristic curve indicated by the solid line to the phase angle at the maximum lift point of the exhaust-valve lift characteristic curve indicated by the one-dotted line in FIG. 25). As set out above, the system of the fifth embodiment can provide the same effects as the fourth embodiment.

In the shown embodiments, as an intake-valve phase control mechanism (VTC2) and an exhaust-valve phase control mechanism (VTC3), a hydraulically-operated vane equipped valve timing control mechanism is used. Alternatively, such a hydraulically-operated type may be replaced by an electromagnetically-operated type. Electromagnetically-operated phase control mechanisms have been disclosed in Japanese Patent Provisional Publication No. 2004-156508 and U.S. Pat. No. 6,832,585 (corresponding to PCT international Application No. PCT/JP01/000576, i.e., PCT Pub. No. WO02/061241), the teachings of which are hereby incorporated by reference.

In the shown embodiments, a variable valve event and lift (VEL) mechanism is provided at the intake-valve side. In lieu thereof, such a VEL mechanism may be provided at the exhaust-valve side as well as the intake-valve side.

Moreover, each of the systems of the first to fourth embodiments uses an intake-valve VEL mechanism (VEL1) with a multinodular-link motion converter having a symmetrical IVO-IVC phase-change characteristic as previously described, whereas the system of the fifth embodiment uses an intake-valve VEL mechanism (VEL1') with a multinodular-link motion converter having an unsymmetrical IVO-IVC phase-change characteristic as briefly discussed in reference to the unsymmetrical IVO-IVC phase-change characteristic, multinodular-link motion converter equipped VEL mechanism as disclosed in U.S. Pat. No. 6,041,746. It will be appreciated that the invention is not limited to the particular embodiment employing the unsymmetrical IVO-IVC phase-change characteristic, multinodular-link motion converter equipped VEL mechanism as disclosed in U.S. Pat. No. 6,041,746. In lieu thereof, another type of unsymmetrical IVO-IVC phase-change characteristic, multinodular-link motion converter equipped VEL mechanism is set forth, for example, in U.S. Pat. No. 7,252,058 corresponding to Japanese Patent Provisional Publication No. 2006-307765, the teachings of which are hereby incorporated by reference.

The entire contents of Japanese Patent Application No. 2008-56234 (filed Mar. 6, 2008) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A variable valve actuation system of an internal combustion engine employing a supercharging device for supercharging intake air into an engine cylinder, comprising:
   a variable valve lift mechanism provided for variably controlling at least an intake-valve lift of engine valves;
   a variable phase control mechanism provided for variably phase-shifting a central phase angle of a valve lift characteristic curve of at least one of intake and exhaust valves; and
   a control system configured to electronically connected to the variable valve lift mechanism, the variable phase control mechanism, and the supercharging device, said control system programmed to perform the following,
   (a) increasing the intake-valve lift by the variable valve lift mechanism when an accelerator opening increases from a small accelerator-opening condition; and
   (b) increasing a valve overlap of the intake and exhaust valves by the variable phase control mechanism, while increasing a boost pressure by the supercharging device, after the intake-valve lift has been increased.

2. The variable valve actuation system as claimed in claim 1, wherein:
   the variable valve lift mechanism is configured to continuously vary at least the intake-valve lift; and
   the variable valve lift mechanism continuously increases at least the intake-valve lift, when the accelerator opening increases from a minimum accelerator-opening condition.

3. The variable valve actuation system as claimed in claim 2, wherein:
   the internal combustion engine has an electronically-controlled throttle valve arranged upstream of the intake valve and located in an intake passage; and
   the control system is further configured to control a throttle opening of the throttle valve to a throttle opening degree substantially corresponding to a full-throttle condition, when the accelerator opening increases from the minimum accelerator-opening condition.

4. The variable valve actuation system as claimed in claim 1, wherein:
   the valve overlap of the intake and exhaust valves is corrected and increased by the variable phase control mechanism, when the boost pressure, produced by the supercharging device, exceeds a predetermined boost pressure value.

5. The variable valve actuation system as claimed in claim 1, wherein:

the supercharging device comprises a mechanical supercharging device, which is operated at an arbitrary timing; and the mechanical supercharging device comes into operation, when the intake-valve lift reaches and exceeds a predetermined lift amount by the variable valve lift mechanism.

6. The variable valve actuation system as claimed in claim 1, wherein:

the supercharging device comprises a mechanical supercharging device, which is operated at an arbitrary timing; and the mechanical supercharging device comes into operation, when an engine speed reaches and exceeds a predetermined engine speed value.

7. The variable valve actuation system as claimed in claim 1, wherein:

the supercharging device comprises a mechanical supercharging device, which is operated at an arbitrary timing; and the mechanical supercharging device comes into operation, when the accelerator opening reaches and exceeds a predetermined accelerator opening.

8. The variable valve actuation system as claimed in claim 1, wherein:

the supercharging device comprises a turbocharger, which is driven by kinetic energy of exhaust gases.

9. The variable valve actuation system as claimed in claim 1, wherein:

the internal combustion engine is equipped with a catalytic converter located in an exhaust passage, and an air/fuel ratio sensor located in the exhaust passage for detecting an air/fuel mixture ratio; and the valve overlap is corrected and decreased by the variable phase control mechanism, when the air/fuel mixture ratio, detected by the air/fuel ratio sensor, is lean and the engine is in a lean mode.

10. The variable valve actuation system as claimed in claim 1, wherein:

the internal combustion engine is equipped with a catalytic converter located in an exhaust passage;

the internal combustion engine is an in-cylinder direct injection engine; and the control system is adapted to be connected to an electronic fuel injection system for injecting fuel directly into the engine cylinder, after the exhaust valve has been closed.

11. A control apparatus of an internal combustion engine, comprising:

a controller programmed to perform the following, (a) increasing an intake-valve lift by a variable valve lift mechanism, which is provided for variably controlling at least the intake-valve lift of engine valves, when starting from a vehicle stand-still state; and (b) increasing a valve overlapping time period, during which intake and exhaust valves are both open, by a variable phase control mechanism, which is provided for variably phase-shifting a central phase angle of a valve lift characteristic curve of at least one of the intake and exhaust valves, while increasing a boost pressure of intake air introduced into an engine cylinder by a supercharging device, after the intake-valve lift has been increased.

12. The control apparatus as claimed in claim 11, wherein:
the variable valve lift mechanism is configured to continuously vary at least the intake-valve lift; and the variable valve lift mechanism variably controls at least the intake-valve lift in a manner so as to continuously increase the intake-valve lift, when starting from the vehicle stand-still state.

13. The control apparatus as claimed in claim 12, wherein:

the internal combustion engine has an electronically-controlled throttle valve arranged upstream of the intake valve and located in an intake passage; and the controller is further configured to control a throttle opening of the throttle valve to a throttle opening degree substantially corresponding to a full-throttle condition, when starting from the vehicle stand-still state.

14. The control apparatus as claimed in claim 11, wherein:

the valve overlapping time period, during which the intake and exhaust valves are both open, is controlled and increased by the variable phase control mechanism, when the boost pressure, produced by the supercharging device, exceeds a predetermined boost pressure value.

15. The control apparatus as claimed in claim 11, wherein:

the supercharging device comprises a mechanical supercharging device, which is operated at an arbitrary timing; and the controller is further configured to shift the mechanical supercharging device to an operative state, when an engine speed reaches and exceeds a predetermined engine speed value.

16. The control apparatus as claimed in claim 11, wherein:

the supercharging device comprises a mechanical supercharging device, which is operated at an arbitrary timing; and the controller is further configured to shift the mechanical supercharging device to an operative state, when the accelerator opening reaches and exceeds a predetermined accelerator opening.

17. The control apparatus as claimed in claim 11, wherein:

the supercharging device comprises a turbocharger, which is driven by kinetic energy of exhaust gases.

18. The control apparatus as claimed in claim 11, wherein:

the internal combustion engine is equipped with a catalytic converter located in an exhaust passage, and an air/fuel ratio sensor located in the exhaust passage for detecting an air/fuel mixture ratio; and the valve overlapping time period, during which the intake and exhaust valves are both open, is controlled and decreased by the variable phase control mechanism, when the air/fuel mixture ratio, detected by the air/fuel ratio sensor, is lean and the engine is in a lean mode.

19. The control apparatus as claimed in claim 11, wherein:

the internal combustion engine is equipped with a catalytic converter located in an exhaust passage;

the internal combustion engine is an in-cylinder direct injection engine; and the controller is adapted to be connected to an electronic fuel injection system for injecting fuel directly into the engine cylinder, after the exhaust valve has been closed.

20. A control apparatus of an internal combustion engine, comprising:

a controller programmed to perform the following, (a) increasing an intake-valve lift by a variable valve lift mechanism, which is provided for variably controlling at least the intake-valve lift of engine valves, when an engine speed rises from an engine idling speed; and (b) increasing a valve overlap between intake valve open timing of an intake valve and exhaust valve closure timing of an exhaust valve by a variable phase control mechanism, which is provided for variably phase-shifting a central phase angle of a valve lift characteristic curve of at least one of the intake and exhaust valves, while increasing a boost pressure of intake air introduced into an engine cylinder by a supercharging device, when the intake-valve lift reaches and exceeds a predetermined lift amount.

* * * * *

UNITED STATES PATENT AND TRADEMARK OFFICE
CERTIFICATE OF CORRECTION

| | | |
|---|---|---|
| PATENT NO. | : 8,036,806 B2 | Page 1 of 1 |
| APPLICATION NO. | : 12/372307 | |
| DATED | : October 11, 2011 | |
| INVENTOR(S) | : Nakamura | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 429 days.

Signed and Sealed this
Thirty-first Day of January, 2012

David J. Kappos
*Director of the United States Patent and Trademark Office*